United States Patent
McKeehan et al.

(10) Patent No.: US 11,702,203 B2
(45) Date of Patent: Jul. 18, 2023

(54) GROUP CONFIGURATIONS FOR A MODULAR DRONE SYSTEM

(71) Applicant: Boy Scouts of America, Irving, TX (US)

(72) Inventors: David Williams McKeehan, Tucson, AZ (US); Michael Dwight Gerard, Fort Mill, SC (US); Craig Alan Nehrkorn, Austin, TX (US); Eric Alan Davis, Austin, TX (US)

(73) Assignee: Boy Scouts of America, Irving, TX (US)

( * ) Notice: Subject to any disclaimer, the term of this patent is extended or adjusted under 35 U.S.C. 154(b) by 328 days.

(21) Appl. No.: 16/921,815

(22) Filed: Jul. 6, 2020

(65) Prior Publication Data

US 2022/0001980 A1  Jan. 6, 2022

(51) Int. Cl.
| | |
|---|---|
| B64C 39/02 | (2023.01) |
| B64C 1/06 | (2006.01) |
| G05D 1/10 | (2006.01) |
| B64U 10/13 | (2023.01) |
| B64U 30/20 | (2023.01) |
| B64U 101/00 | (2023.01) |

(52) U.S. Cl.
CPC ............ *B64C 39/024* (2013.01); *B64C 1/063* (2013.01); *G05D 1/104* (2013.01); *B64C 2211/00* (2013.01); *B64U 10/13* (2023.01); *B64U 30/20* (2023.01); *B64U 2101/00* (2023.01); *B64U 2201/102* (2023.01); *B64U 2201/20* (2023.01)

(58) Field of Classification Search
CPC . B64C 39/024; B64C 1/063; B64C 2201/027; B64C 2201/108; B64C 2201/126; B64C 2201/143; B64C 2201/146; B64C 2211/00; B64C 2201/104; B64C 2201/20; B64C 37/02; G05D 1/104
USPC ...................................... 701/3; 244/76 R, 189
See application file for complete search history.

(56) References Cited

U.S. PATENT DOCUMENTS

| | | | |
|---|---|---|---|
| 1,821,323 | A | 9/1931 | Roberts |
| 9,616,998 | B2 | 4/2017 | Oakley et al. |
| 9,957,045 | B1 * | 5/2018 | Daly ....................... B64C 37/02 |
| 10,099,784 | B1 | 10/2018 | Nilson et al. |

(Continued)

FOREIGN PATENT DOCUMENTS

KR     1020170120802 A     11/2017

OTHER PUBLICATIONS

"Crazy2Fly Frame Assembly Guide" (Lynxmotion) Dec. 4, 2013 (Dec. 4, 2013) [online] 1-11, 17-20 retrieved from URL: https://www.robotshop.com/media/files/pdf/crazy2fly-assembly-guide.pdf.

(Continued)

*Primary Examiner* — Elaine Gort
*Assistant Examiner* — Ellis B. Ramirez
(74) *Attorney, Agent, or Firm* — Amsel IP Law PLLC; Jason Amsel

(57) ABSTRACT

A modular flat-packable drone kit includes a plurality of components that can be assembled into a drone. Components of the drone kit include elements that may be cut from a flat sheet of material, thereby enabling low cost manufacturing and compact packaging and may be assembled without specialized tools. A set of drones may operate in a standalone mode or may be coupled together and operated in a group configuration.

18 Claims, 18 Drawing Sheets

(56) References Cited

U.S. PATENT DOCUMENTS

| | | | |
|---|---|---|---|
| 2012/0083945 A1* | 4/2012 | Oakley | G05D 1/0858 |
| | | | 701/2 |
| 2013/0287577 A1* | 10/2013 | Lin | B64C 39/024 |
| | | | 416/21 OR |
| 2014/0145026 A1 | 5/2014 | Skjersaa | |
| 2016/0050011 A1* | 2/2016 | Frolov | H04B 7/18506 |
| | | | 455/431 |
| 2016/0123182 A1* | 5/2016 | Samaritano | B64C 27/08 |
| 2016/0378108 A1* | 12/2016 | Paczan | B64D 31/06 |
| | | | 705/330 |
| 2017/0283050 A1 | 10/2017 | Baek et al. | |
| 2017/0371354 A1* | 12/2017 | Matus | B64C 27/52 |
| 2019/0002124 A1* | 1/2019 | Garvin | B64C 39/024 |
| 2019/0047698 A1* | 2/2019 | Jassowski | G05D 1/104 |
| 2019/0210724 A1* | 7/2019 | Bublitsky | B64C 3/10 |
| 2020/0307755 A1 | 10/2020 | Zhang et al. | |
| 2021/0197965 A1 | 7/2021 | Kunz et al. | |

OTHER PUBLICATIONS

PCT International Search Report and Written Opinion, PCT Application No. PCT/US2021/039471, dated Nov. 29, 2021, 18 pages.
Office Action in U.S. Appl. No. 16/921,806 dated Jun. 23, 2022 (10 pages).

* cited by examiner

GROUP CONFIGURATIONS FOR A MODULAR DRONE SYSTEM

BACKGROUND

Technical Field

This application relates generally to a drone system.

Description of the Related Art

Unmanned aerial vehicles, or drones, are presently utilized in a wide variety of applications. For example, drones may be utilized for aerial photography, inspection tasks, or recreational activities. Commercially available drones are generally highly integrated devices that are professionally manufactured in a manner that requires specialized facilities, equipment, and expertise, and have limited configurability.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practical similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A configurable drone system includes a set of modular components. In an embodiment, a modular flat-packable drone kit includes a plurality of components that can be assembled into a drone. The main body of the drone can be assembled primarily from a set of flat plates that can be cut from a sheet of material, thereby enabling low cost manufacturing and compact packaging. Furthermore, the drone can be assembled without specialized tools. For example, the components may be secured together using a combination of securing structures integrated into the sheets (e.g., mortise and tenon, tongue and groove, or other mechanisms) and elastic bands. The drone kit may be compatible with various swappable components to enable the drone to be built in multiple different configurations. For example, the drone may be configured using different sized propellers or may be configured with the propellers either above or below the air frame arms. The drone may furthermore be configured with various modular accessories such as an external camera, a grabbing arm, or a wing attachment. In further embodiments, a set of drone kits, each operable as a standalone drone, may be coupled into a group configuration. When coupled in the group configuration, a controller of one of the drones may be repurposed as a master flight management unit for the group. Other flight management units may be optionally repurposed to perform various auxiliary functions.

Figure 1:
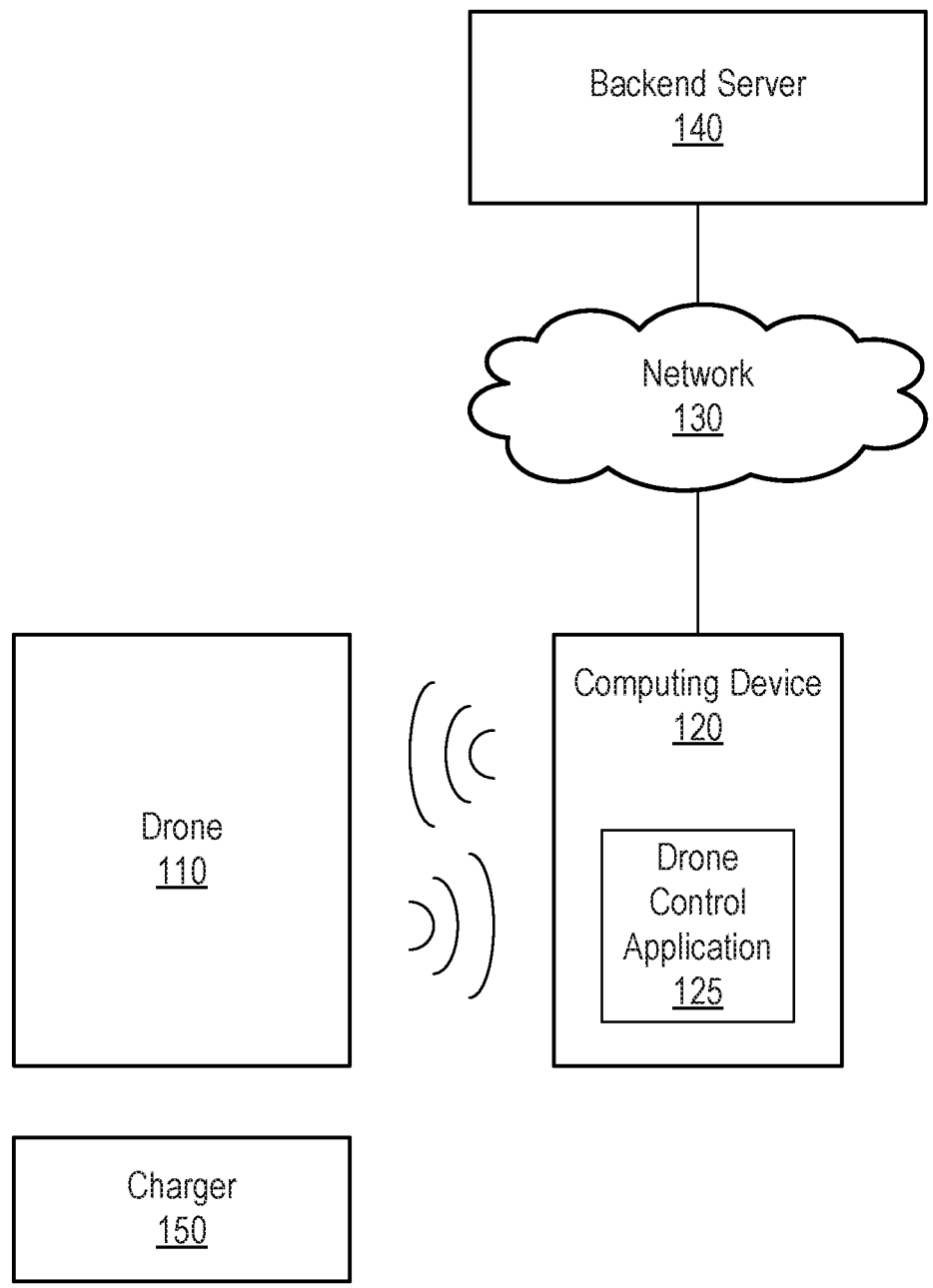
FIG. 1 is a block diagram illustrating an example embodiment of an environment for operating a drone.

FIG. 1 illustrates an example environment 100 for a drone 110. The environment 100 includes a drone 110, a charger 150, a computing device 120 having a drone control application 125, a network 130, and a backend server 140. Alternative embodiments may include different or additional components.

The drone 110 comprises an unmanned aerial vehicle that can execute a flight. The drone 110 may comprise, for example, a multirotor aircraft such as a tricopter, quadcopter, hexacopter, or octocopter that generates lift and controls flight based on varying the relative speeds of each propeller. For example, the drone 110 may receive wireless control signals and control rotation of the propellers to execute the flight pattern. In various embodiments, at least some aspects of the flight may be controlled autonomously or semi-autonomously based on flight control algorithms executed by an on-board flight management unit. Example embodiments of a drone 110 are described in further detail below.

The computing device 120 comprises, for example, a mobile device, a tablet, a laptop computer, a desktop computer, a server, a dedicated remote controller, a gaming console, or other device that can wirelessly communicate with the drone 110 for sending control signals to the drone 110 and receiving telemetry data, sensor data, and/or other communication data from the drone 110 during flight. The computing device 120 may furthermore communicate with the drone 110 via a wired (e.g., USB) or wireless interface for purposes of troubleshooting, programming memory, and reconfiguring the drone 110. The computing device 110 may execute a drone control application 125 that includes a user interface to enable a user to interact with the drone 110 via the computing device 120. For example, during flight, the drone control application 125 may receive flight control inputs from a user via the user interface and generate control signals to control flight maneuvers of the drone 110 based on the user inputs. Furthermore, the drone control application 125 may receive sensor data from the drone 110 and generate various types of flight information that may be accessible to the user via the user interface or accessible to another application or device via an application programming interface (API). The computing device 120 may include an integrated display for viewing a user interface associated with the drone control application 125, video captured by the drone 110, or other data relating to operation of the drone 110. Furthermore, the computing device 120 may include a wired or wireless interface for connecting to an external system. In an embodiment, a headset or first-person viewer goggles with an integrated display may be used to display video captured by the drone 110 or other data associated with its operation. In an embodiment, the computing device 120 comprises a processor and a non-transitory computer-readable storage medium that stores instructions that when executed by the processor, cause the processor to carry out functions attributed to the drone control application 125 described herein.

The network 130 represents a communication pathway between the computing device 120, the backend server 140, and other devices (not shown) coupled to the network 130. The network 130 may utilize standard communication technologies and/or protocols and can include a local area network (LAN), a wide area network (WAN), a cellular network, the Internet, or a combination thereof.

The backend server 140 comprises a computer (or set of computers) that communicates with the computing device 120 or other devices via the network 130. The backend server 140 may provide one or more services that are accessible to the drone control application 125. For example, the backend server 140 may maintain a user account database, a drone database, or other databases that store information relevant to operation of the drone 110 and/or the drone control application 125 and that can be remotely accessed by the drone control application 125 via the network 130. Additionally, the backend server 140 may provide streaming media content (e.g., instructional videos), analytical information relating to flight data, or other information to the drone control application 125.

The charger 150 supplies power (from a power source) to the drone 110 to charge a battery of the drone 110. In an embodiment, the charger 150 may include a custom interface for coupling to a reciprocal interface of the drone battery to enable charging. Alternatively, the charger 150 may utilize a conventional interface and/or charging technology such as, for example, a Universal Serial Bus (USB) charger that couples to the drone 110 via a USB interface. The charger 150 may include a set of cables that couple to cables of the drone 110 to enable battery charging.

Figure 2:
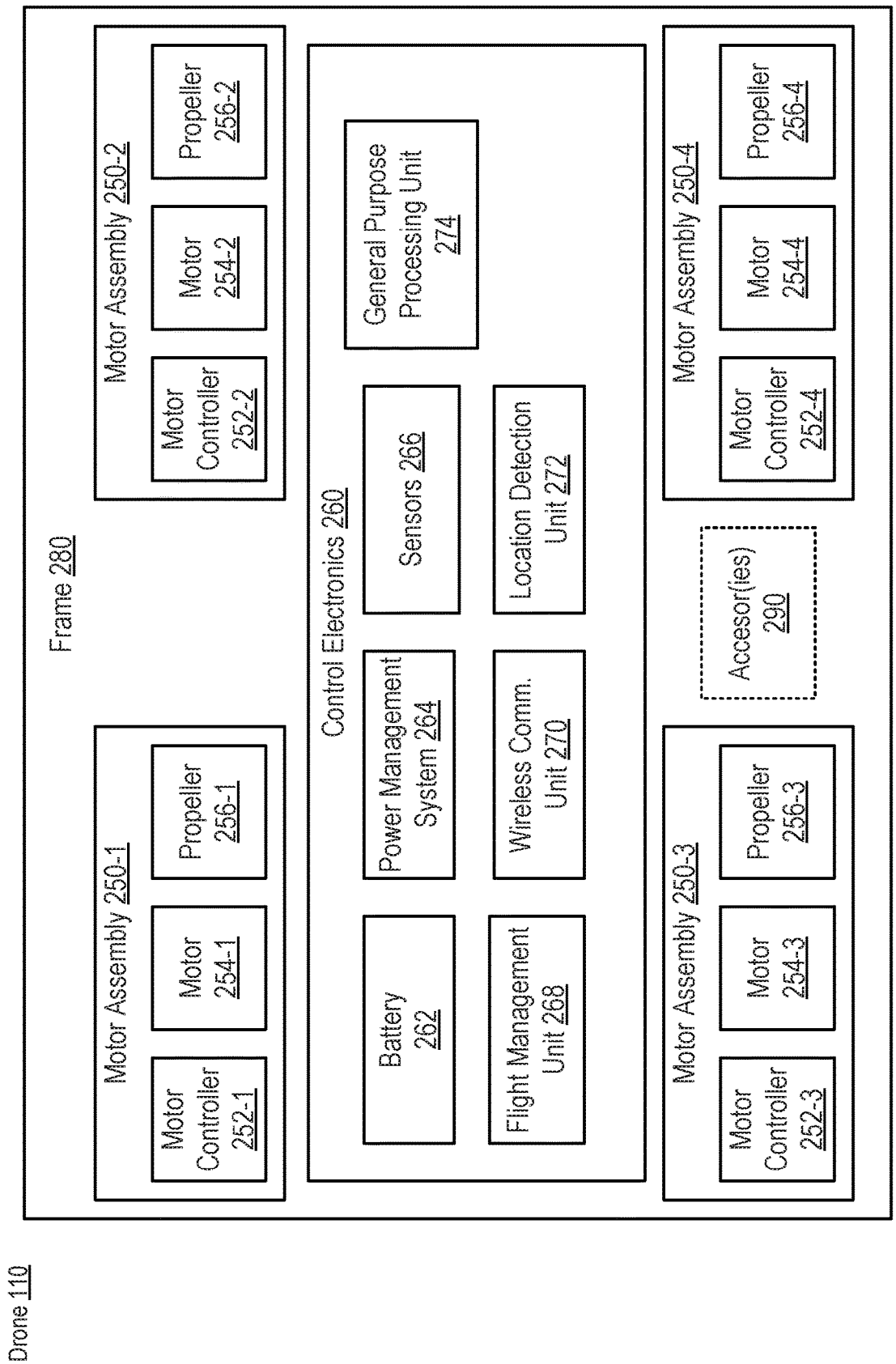
FIG. 2 is a logical block diagram illustrating an example embodiment of a drone.

FIG. 2 is an example logical block diagram of a drone 110. The drone 110 comprises a frame 280, a plurality of motor assemblies 250 (e.g., motor assemblies 250-1, 250-2, 250-3, 250-4), control electronics 260, and optionally, one or more accessories 290. In alternative embodiments, the drone 110 may include different or additional components.

The frame 280 comprises a supporting structure for supporting other components of the drone 110. In an embodiment, the frame 280 may comprise a lightweight and substantially rigid material (e.g., a plastic) suitable for aerial flight. In an embodiment of a flat-packable drone 110, the frame 280 may comprise a plurality of substantially flat structures (i.e., plates) that may be cut from any thin flat material and connected using a set of connecting elements. Examples of suitable materials may include plastics, thin wood laminates, carbon composites, 3-D printed filaments, polycarbonates (clear plastic), or other materials. In this configuration, the elements of the frame 280 can be inexpensively manufactured and can be flat-packed in a compact package. Furthermore, the frame 280 can be assembled without specialized tools. Additionally, the modular nature of the drone 110 enables ease of repair because damaged elements can be removed and replaced at low cost and without specialized tools. Furthermore, the modularity enables the possibility of configuring the drone 110 with different customized physical shielding suitable for different situations (e.g., by swapping in or out plates of different materials depending on expected environmental conditions). Example embodiments of a frame 280 and associated assembly processes are described in further detail below.

In alternative embodiments, the frame 280 is not necessarily modular or flat-packable. For example, the frame 280 may comprise a unibody molded frame produced using conventional manufacturing processes.

The motor assemblies 250 generate lift and control flight maneuvers in response to control signals from the control electronics 260. Each motor assembly 250 may comprise a motor controller 252, a motor 254, and a propeller 256. In alternative embodiments, the motor assembly 250 may comprise different or additional modules. In operation, the motor controller 252 receives a control signal (e.g., representing a desired rotational speed or other control function) from the control electronics 260 and controls power supplied to the motor 254. The motor 254 rotates the propeller 256 responsive to the applied power (e.g., with a rotational speed that is linearly or non-linearly proportional to the applied power). To execute different flight maneuvers, different control signals may be provided to different motor controllers 252 to cause the motors 254 and associated propellers 256 to rotate at different speeds, thereby enabling the drone 110 to execute different motions during flight.

The control electronics 260 comprises a battery 262, a power management system 264, sensors 266, a flight management unit 268, a wireless communication unit 270, a location detection unit 272, and a general purpose processing unit 274. Alternative embodiment may include additional or different components.

The battery 262 supplies power to the power management system 264 of the drone 110. The battery 262 may comprise, for example, a rechargeable lithium-ion battery or other type of rechargeable battery.

The power management system 264 manages power of the drone 110. For example, the power management system 264 may receive power from the battery 262, convert the power to various voltages (and/or currents) associated with different control electronics 260, and to the motor assemblies 250, and routes the appropriate power to the components. Furthermore, the power management 264 may monitor a charge level of the battery 262, which may be used by other control electronics 260 to control operation of the drone 110 (e.g., by automatically initiating a landing when the charge level drops below a certain threshold).

The flight management unit 268 manages flight of the drone 110 based on sensor data, on-board flight algorithms, and/or flight control signals received from the drone control application 125. For example, the flight management unit 268 may receive a control signal from the drone control application 125 indicated a desired flight motion (e.g., navigating forwards, backwards, left, right, up, or down, hovering in place, rotating, etc.) and generate appropriate motor control signals for each of the motor assemblies 250 to execute the desired motion. The flight management unit 268 may furthermore obtain sensor data from the sensors 266 to adjust the control signals to the motor assemblies 250 based on the sensed conditions. For example, the flight management unit 268 may adjust the control signals to the motor assemblies 250 based on sensed motion data in a feedback loop. In some embodiments, the flight management unit 268 may execute an automated or semi-automated flight plan in response to a sensed event or an instruction from the drone control application 125. For example, the flight management unit 268 may sense when the battery 262 is low and automatically execute a flight path to return the drone 110 to a default landing location in response to the detection. The flight management unit 268 may furthermore collect, aggregate, and/or otherwise process sensor data obtained from the sensors 266 for storing locally and/or transmitting to the drone control application 125. In an embodiment, the flight management unit 268 may be implemented as a processor and a non-transitory computer-readable storage medium storing instructions that when executed by the processor cause the processor to carry out the functions attributed to the flight management unit 268 as described herein.

The wireless communication unit 270 comprises one or more communication devices for communicating with the computing device 120 or other wireless devices. For example, the wireless communication unit 270 may receive control signals from the computing device 120 and transmit telemetry data to the computing device 120. The wireless communication unit 270 may communicate according to conventional communication protocols such as, for example, a Micro Air Vehicle Link (MAVlink) protocol, a WiFi protocol, a cellular communication protocol, a Bluetooth protocol, or a custom communication protocol.

The location detection unit 272 tracks the position of the drone 110. In an embodiment, the location detection unit 272 may comprise a Global Positioning System (GPS) device that tracks the location of the drone 110 based on GPS satellite data. In an alternative embodiment, the location detection unit 272 may comprise other location-sensing technology (e.g., LiDAR).

The sensors 266 comprise one or more elements for detecting environmental conditions that may be provided to the flight management unit 268 and/or transmitted to the drone control application 125 via the wireless communication unit 270. The sensors 266 may include, for example, one or more inertial measurement units (IMUS) for detecting acceleration, velocity, rotation, or a combination thereof. The sensors 266 may furthermore comprise, for example, an altimeter, a barometer, a temperature sensor, a wind sensor, a lidar sensor, one or more microphones, or more cameras, or other conventional sensors. In an embodiment, some of the sensors (e.g., the IMU) may be integrated with the flight management unit 268.

The general-purpose processing unit 274 comprises a microprocessor and a memory configured to execute a set of instructions relating to operation of the drone 110. In an embodiment, the general purpose processing unit 274 may perform computationally intensive on-drone control algorithms such as those associated with a radio transmission link for video transmissions, camera orientation controls, tracking and auto-camera functions, LED light control to enable aerial light shows, or other programmable features. The general-purpose processing unit 274 may optionally be integrated with the flight management unit 268 or may comprise an independent processing unit.

The drone 110 may be configured to enable attachment of one or more accessories 290 to perform an auxiliary function associated with the drone 110. For example, in an embodiment, a mechanical arm with a grabber may be attached to the frame 280 that is remotely controllable via the drone control application 125 to enable the drone to pick up and carry various payloads. In another embodiment, a gimbal arm may be attached to the drone 110 to enable attachment of an external camera. The gimbal arm and the external camera may be remotely controllable via the drone control application 125 to enable positioning and rotation of the camera and to control the camera to capture images and/or video that is stored locally or remotely transferred to the drone control application 125. In another embodiment, a wing attachment and a tail attachment may be attached to the drone 110 to enable a forward flight configuration as described in further detail with respect to FIG. 7 below. In another embodiment, the accessories 290 may include a projectile device such as a foam dart gun or other non-lethal game-style projectile system. In yet another embodiment, the accessories 290 may include a lighting system comprising various spotlights, flood lights, LED lighting systems, or other lights that can be turned on or off by the control electronics 260 autonomously or based on control signals from the computing device 120. In yet another embodiment, the accessories 290 may include a package delivery system that enables a package to be picked up and carried to a desired delivery location. In yet another embodiment, the accessories 290 may include an aerosol or liquid spray systems. In yet another embodiment, the accessories 290 may include a radio relay system such as a WiFi extender that enables operation of an outdoor WiFi network. In yet another embodiment, the accessories 290 may include a microphone to capture audio in the environment of the drone 110. In yet another embodiment, the accessories 290 may include a speaker system to enable the drone 110 to output audio based on a received audio signal. In an embodiment, different swappable accessories 290 may each include a universal connector that mates with a reciprocal connector on the frame 280 of the drone 110.

Figure 3A:
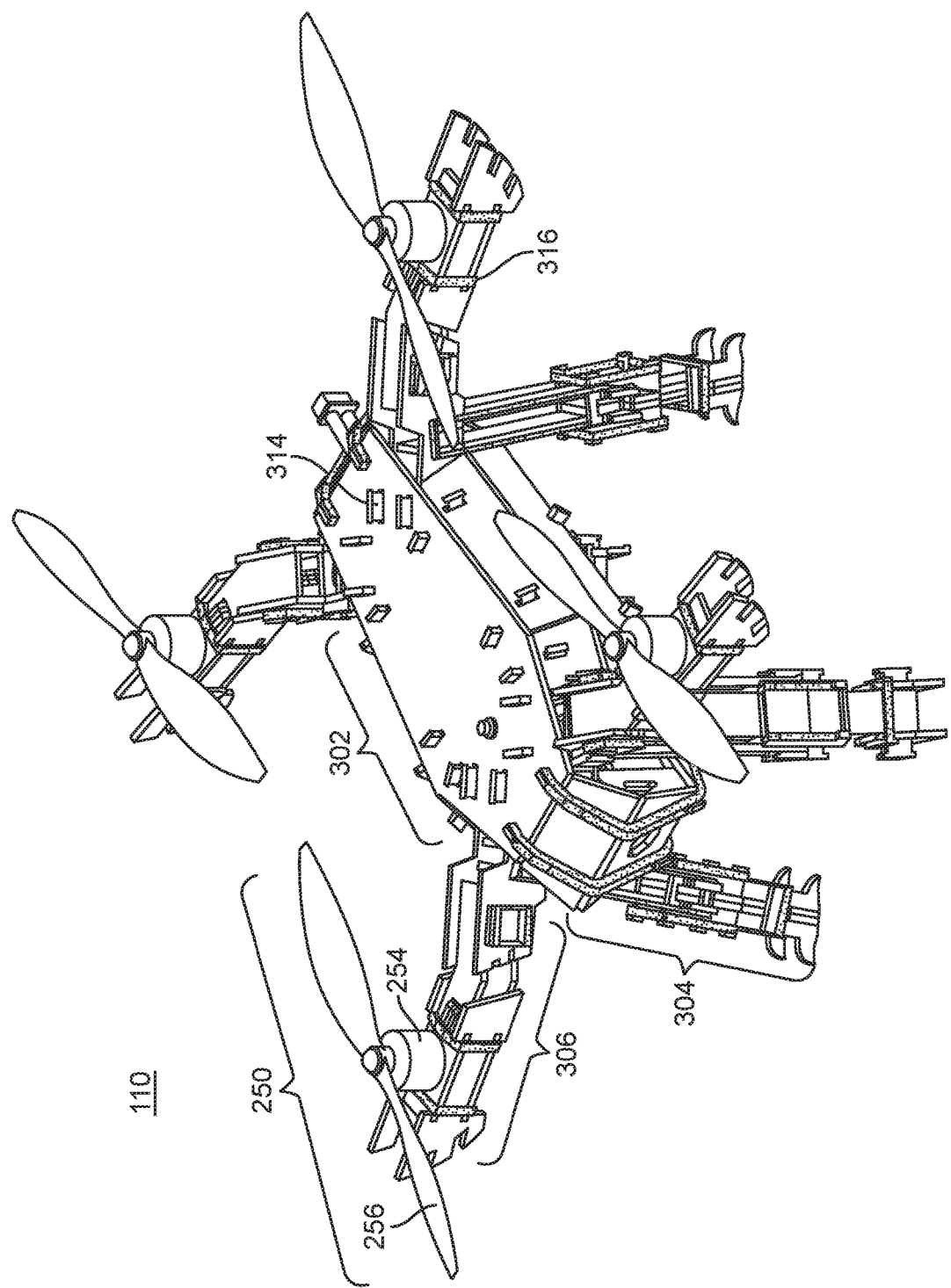
FIG. 3A illustrates a first perspective view of an example embodiment of a drone assembled from a set of flat packable elements of a drone kit.
Figure 3B:
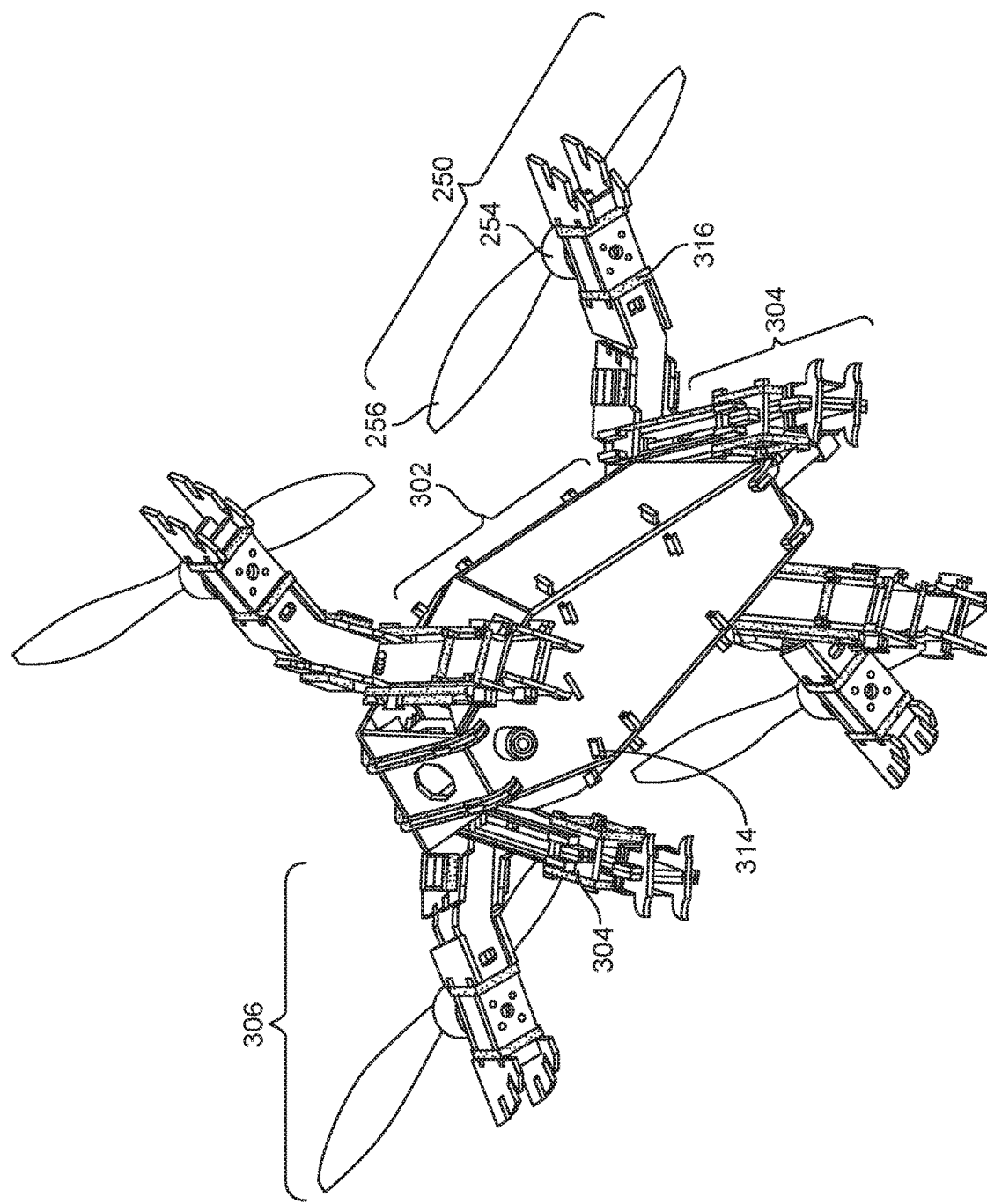
FIG. 3B illustrates a second perspective view of example embodiment of a drone assembled from a set of flat packable elements of a drone kit.

FIGS. 3A-B illustrate an embodiment of a drone 110 that can be assembled from a drone kit primarily of flat-packable components. The drone 110 can be assembled without use of specialized tools or professionally manufacturing equipment, and can be easily repaired quickly and at low cost by swapping damaged components for new ones. The drone 110 comprises a main air frame body 302, a plurality of air frame legs 304 (e.g., four air frame legs), and a plurality of air frame arms 306 (e.g., four air frame arms) which each include a motor assembly 250 comprising a motor 254 and a propeller 256. The drone air frame 280 of the drone 110 may be assembled primarily from a set of variously shaped plates that are secured together using a combination of integrated securing structures 314 and a set of elastic bands 316.

The integrated securing structures 314 may include, for example, mortise and tenon joints. The mortise and tenons may be dimensioned such that the tenons can slide through the mortises with the edges of mortises fitted around the reciprocally structured tenons. The tenons may furthermore include dovetail tenon joints on their upper surface to prevent the tenons from slipping out of the respective mortises. In some instances, the dovetail tenon joints may furthermore be utilized to secure the elastic bands 316 in place. The elastic bands 316 may be secured around various components of the drone air frame 280 to secure the plates together. In some instances, the elastic bands 316 may secure around sets of two or more tenons. In other instances, the elastic bands 316 may secure around surfaces of two or more plates that are linked together. In alternative embodiments, different integrated securing structures such as other grooves, slots, or protrusions may be utilized in place of or in addition to the mortise and tenon joints.

In an embodiment, the motor assemblies 250 are each held to the respective air frame arms 306 by screws or other fasteners, but the drone air frame 280 is otherwise held together using only the integrated securing mechanisms 314 and elastic bands 316. In an embodiment, the drone 110 is built entirely from the flat plates with the exception of the motor assemblies 250, the elastic bands 316, and internal electronics. These flat plates may be structured such that they can be cut from a sheet of thin flat material (e.g., plastic, wood laminates, carbon composites, etc.), thus enabling low cost manufacturing. For example, the plates may be cut using techniques such as laser cutting, CNC milling, water jet cutting, stamping, or other cutting techniques. Alternatively, the flat plates may be 3D printed without necessarily being cut from a sheet. Prior to assembly, the flat plates may furthermore be stackable to enable these components of the drone kit to be flat-packable.

The main air frame body 302 is structured to house the electronics 260 of the drone 110 and to provide a central hub for coupling the air frame legs 304 and air frame arms 306. In an embodiment, the main air frame body 302 substantially comprises a polyhedron (e.g., an irregular polyhedron) formed from a plurality of plates include a top plate forming a top surface, a bottom plate forming a bottom surface, a set of front plates, a set of rear plates, and a set of left and right side plates. In an embodiment, the top and bottom plates may comprise irregular elongated hexagons.

The air frame legs 304 are structured to extend below and downward from the main air frame body 302 at an offset vertical and are positioned to enable the drone 110 to stand in an upright position on a surface with the bottom of the legs 304 as the sole contact surfaces. In an embodiment, the air frame legs 304 attach to the main air frame body 302 at respective attachment points near the corners of the main air frame body 302.

The air frame arms 306 are structured to extend laterally from the air frame body 302. In an embodiment, the air frame arms 306 may attach to the main air frame body 302 at the same respective attachment points as the air frame legs 304. The air frame arms 306 each include a motor assembly 250 that comprises a motor 254 and a propeller 256 near a distal end of the air frame arms 306. In an embodiment, the motor assemblies 250 may attach to the air frame arms 306 using screws or other fasteners.

In an embodiment, the motor assemblies 250 may be interchangeably configured in an upright position as shown with the propeller 256 rotating above the airframe arms 306 or an inverted position with the propeller 256 rotating below the air frame arms 306 as described below with respect to FIG. 5. Furthermore, the motor assemblies 250 may be swapped in a modular manner for different-sized motors 254 and propellers 256 depending on the desired flight characteristics.

Figure 4A:
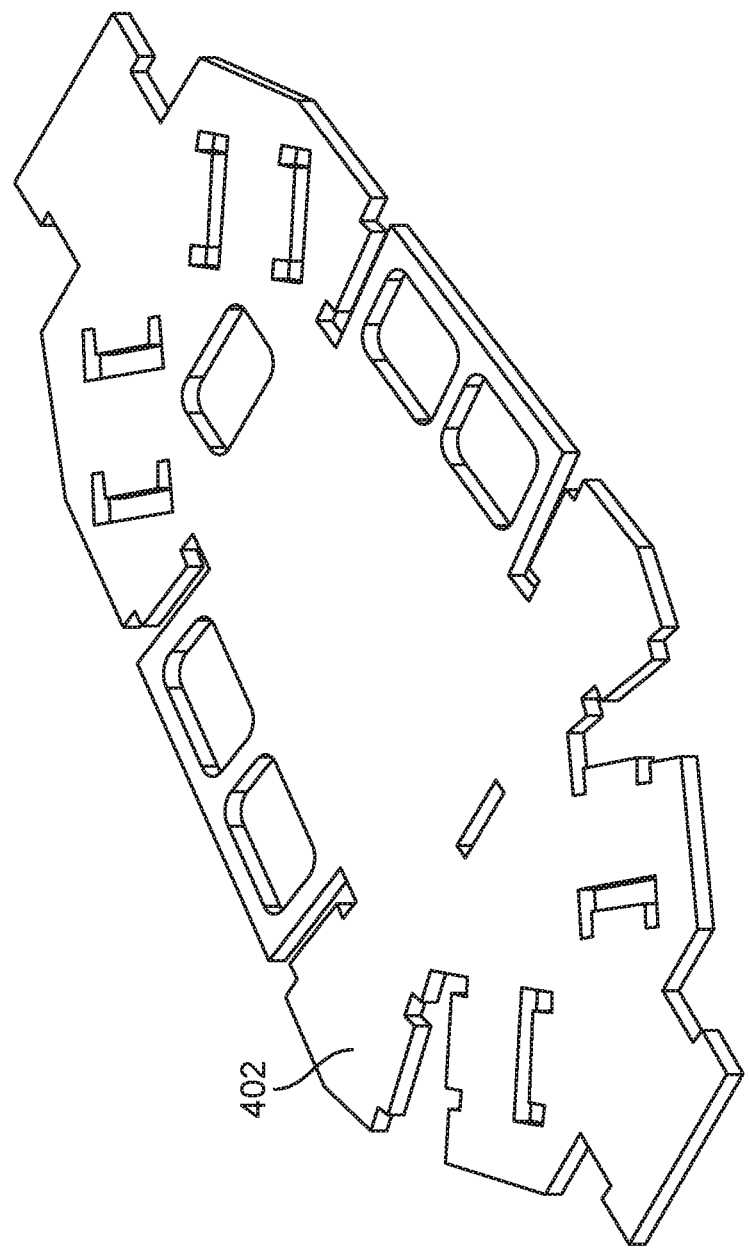
FIG. 4A illustrates a first subset of components of an example embodiment of a partially assembled drone.

FIGS. 4A-G illustrate various subsets of components of the drone 110 that further illustrate the internal structure of the drone 110. FIG. 4A illustrates a center plate 402 of the main air frame body 302. The center plate 402 comprises a plurality of cutouts, mortises, and tenons that enable it to be secured with other components as further described below.

Figure 4B:
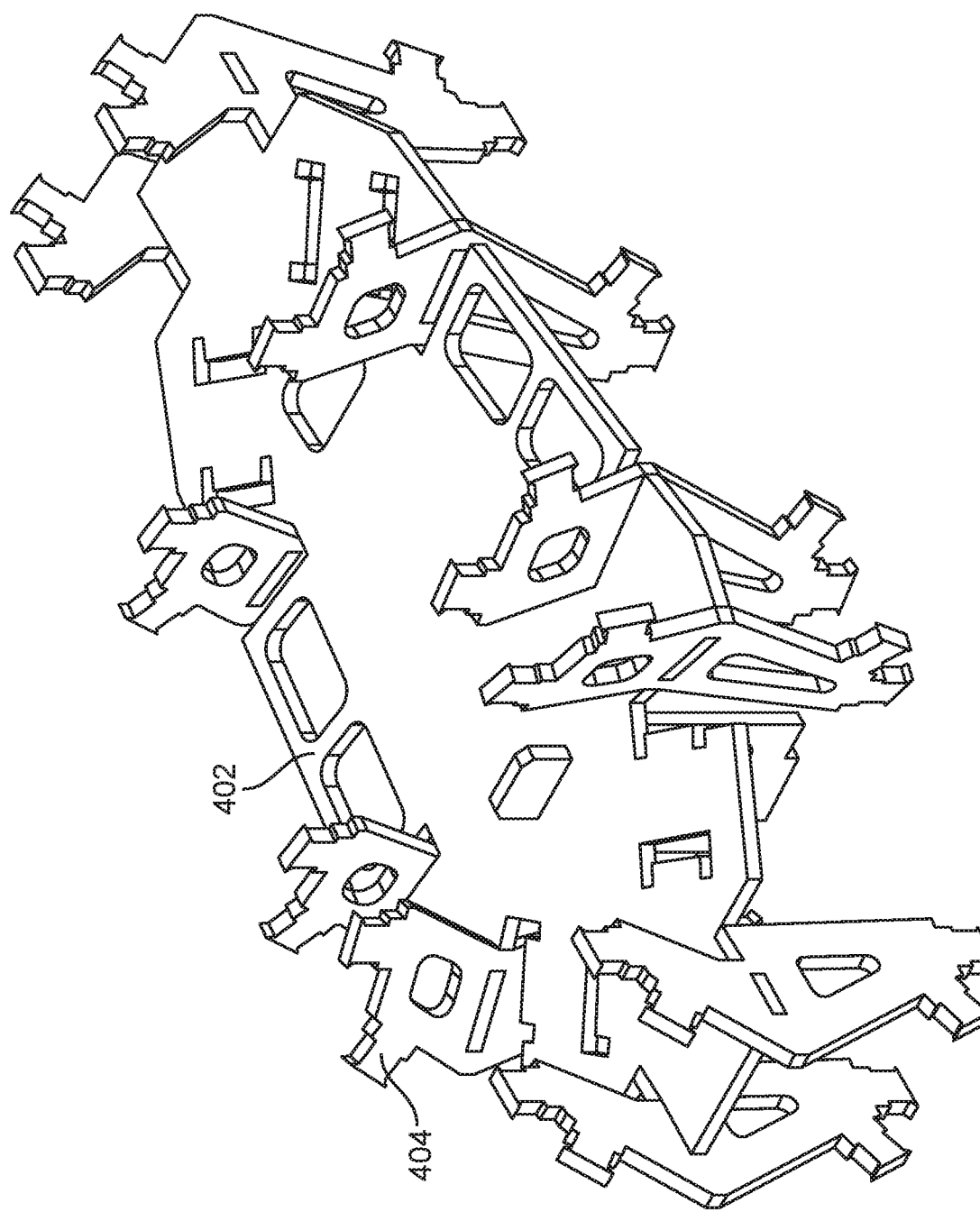
FIG. 4B illustrates a second subset of components of an example embodiment of a partially assembled drone.

FIG. 4B illustrates the center plate 402 with a plurality of connector plates 404 positioned to mate with the center plate 402. For example, the connector plates 404 may slide into slots in the center plate 402, and be joined with tenons of the center plate 402 that project into the slots. When coupled, the primary surfaces of the connector plates 404 may be positioned substantially perpendicular to the primary surface of the center plate 402.

Figure 4C:
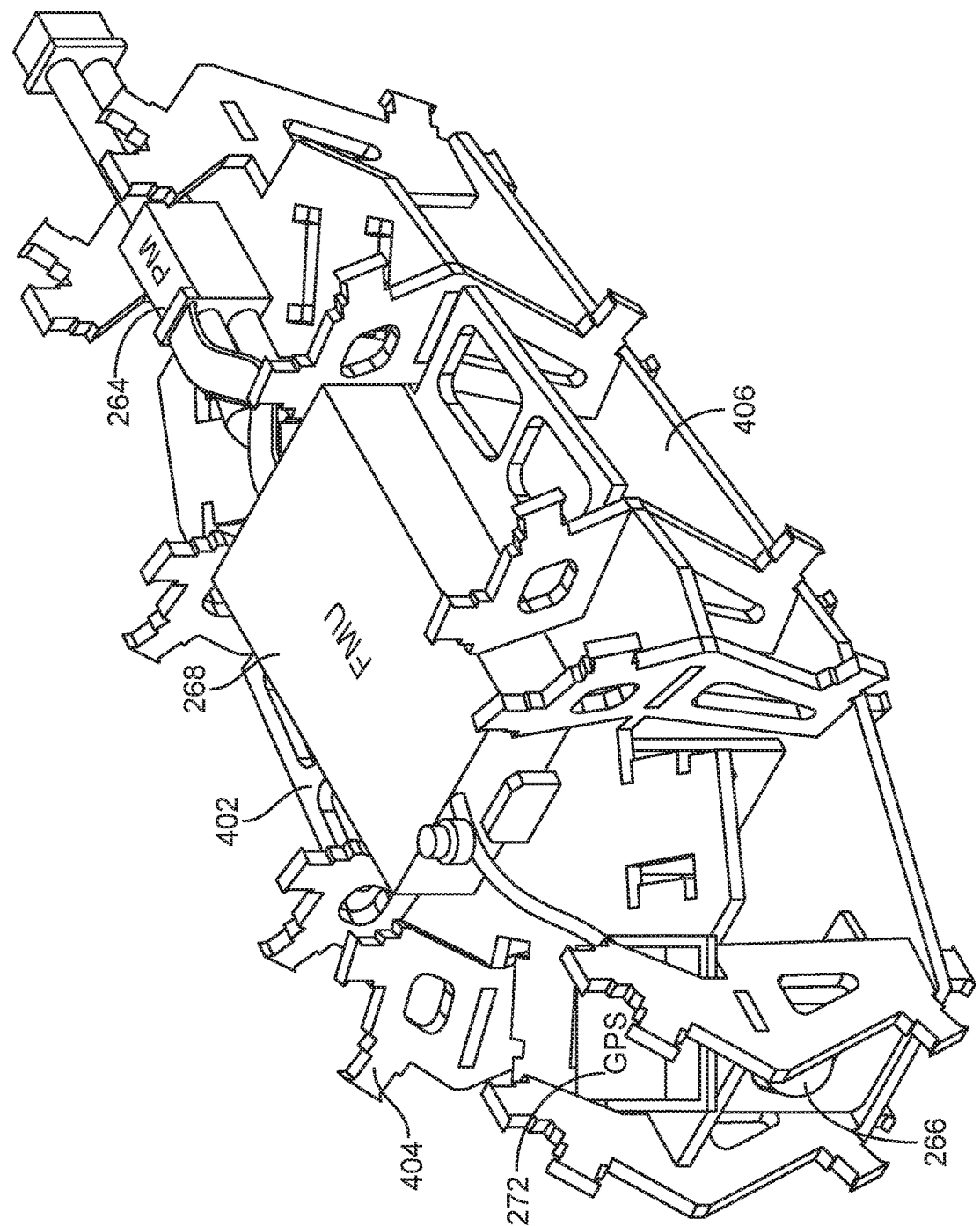
FIG. 4C illustrates a third subset of components of an example embodiment of a partially assembled drone.

FIG. 4C illustrates the center plate 402 and connector plates 404 of FIG. 4B, together with a bottom plate 406 and a subset of the control electronics 260. Here, the bottom plate 406 has a shape substantially similar to the center plate 402 and is positioned with its primary surface substantially parallel to the primary surface of the center plate 402. The bottom plate 406 includes various mortises that mate with lower tenons of the connector plates 404 such that the bottom plate 406 and center plate 402 are secured in a stacked configuration with a gap in between.

The subset of the control electronics 260 seen in FIG. 4C includes the flight management unit (FMU) 268, the location detection unit (GPS) 272, the power management system (PM) 264, and one of the sensors 266 (e.g., a camera), together with various connectors. Other control electronics 260 described above are not necessarily visible in FIG. 4C.

Figure 4D:
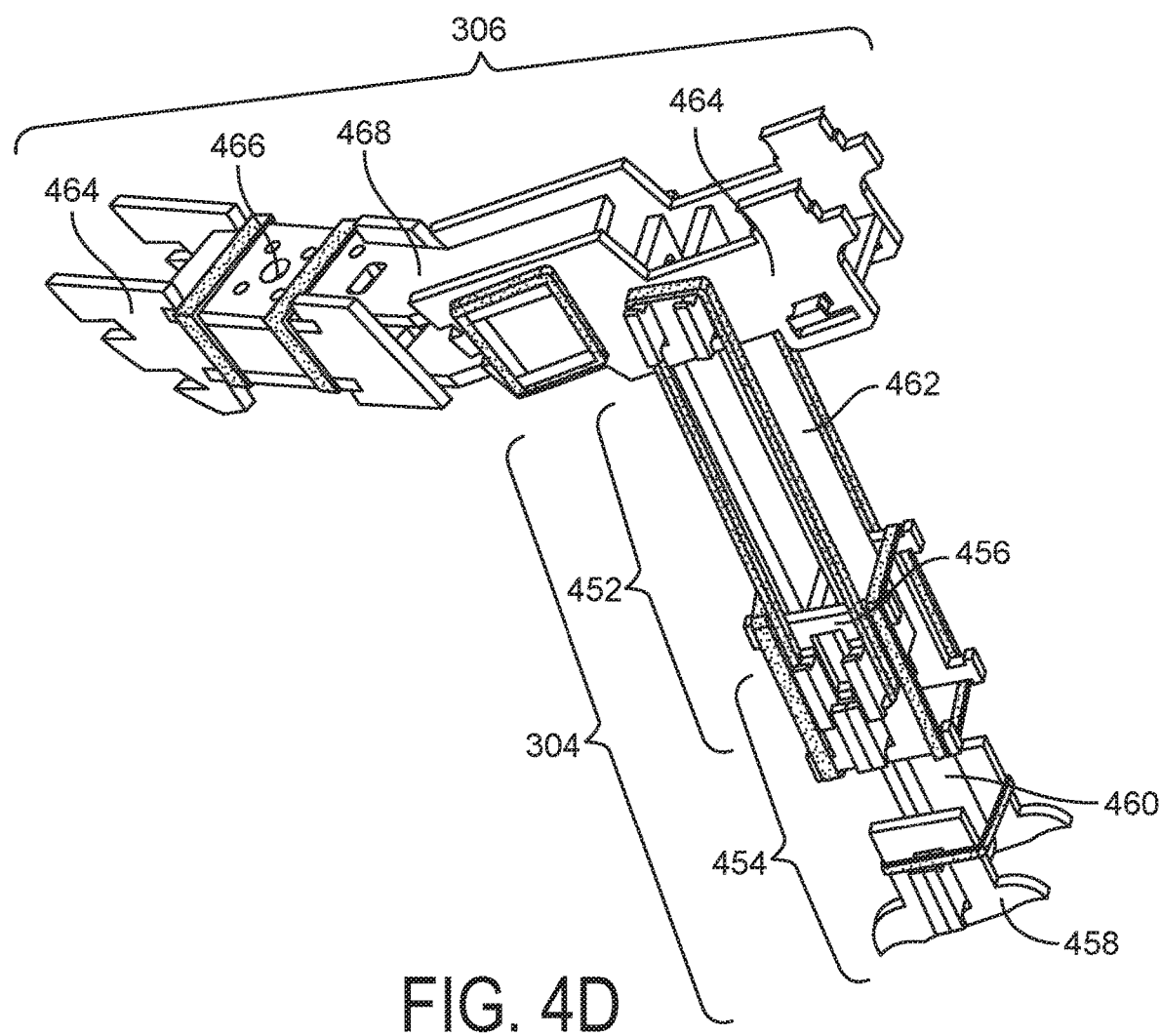
FIG. 4D illustrates a fourth subset of components of an example embodiment of a partially assembled drone.

FIG. 4D illustrates an example of an air frame leg 304 and air frame arm 306 separated from the main air frame body 302. For illustrative purposes, the motor assembly 250 is omitted from FIG. 4D. The air frame leg 304 comprises an upper leg 452 and a lower leg 454 that are held together by a shock absorption sliding connector 456. In the illustrated configuration, the lower leg 454 comprises a set of lower leg plates 460 and a set of feet 458. The upper leg 452 comprises a set of upper leg plates 462 positioned in an offset stack with the lower leg plates 460 such that the upper leg plates 452 are the outer plates in the stack and the lower leg plates 460 are the inner plates of the stack. The feet 458 comprise mortises for mating with tenons of a lower end of the set of lower leg plates 460 to secure the lower leg plates 460 together. The feet 458 are furthermore structured to form a base on which the drone 110 can stand. The shock absorption sliding connector 456 comprise a pair of plates with mortises structured to mate with tenons of an upper end of the set of lower leg plates 460 and a lower end of the set of upper leg plates 462 in an overlapping area of the offset stack to secure the set of lower leg plates 460 and the set of upper leg plates 462 together.

The legs 304 are structured as a shock absorption system to protect the drone 110 from damage due to hard landings. The lower leg 454 is configured to slide up and down relative to the upper leg 452 (e.g., with the lower leg plates 460 sliding inside the upper leg plates 462). The range of motion is constrained by the length of the mortises in the shock absorption sliding connector 456 and the motion parameters controlled by the elastic bands 316. The elastic bands 316 hold the lower leg 454 at full extension relative to the upper leg 452 under static conditions without an external compressive force applied to the legs 304. When experiencing a compressive load, the lower leg 454 slides up into the upper leg 452 with increasing resistance provided by the elastic bands 316. The shock absorption system further enhances repairability of the drone 110 and protects the main body 302 and control electronics 260 by reducing damage from hard landings.

The air frame arm 306 includes a set of horizontal plates 468 and a set of vertical plates 464. The horizontal plates 468 include various tenons that mate with various mortises or grooves of the vertical plates 464 to form the air frame arm 306. The vertical plates 464 furthermore include mortises for mating with tenons of the upper leg plates 462 of the upper leg 452. The horizontal plates 468 include holes 466 to enable securing of the motor assembly 250 near a distal end of the air frame arm 306. The structure of the air frame arm 306 provides an open channel through the center of the air frame arm 306 for a cable to connect the motor 254 to the motor controller 252 and for a cable to connect the motor controller 252 to the electronics 260 in the main air frame body 302.

Figure 4E:
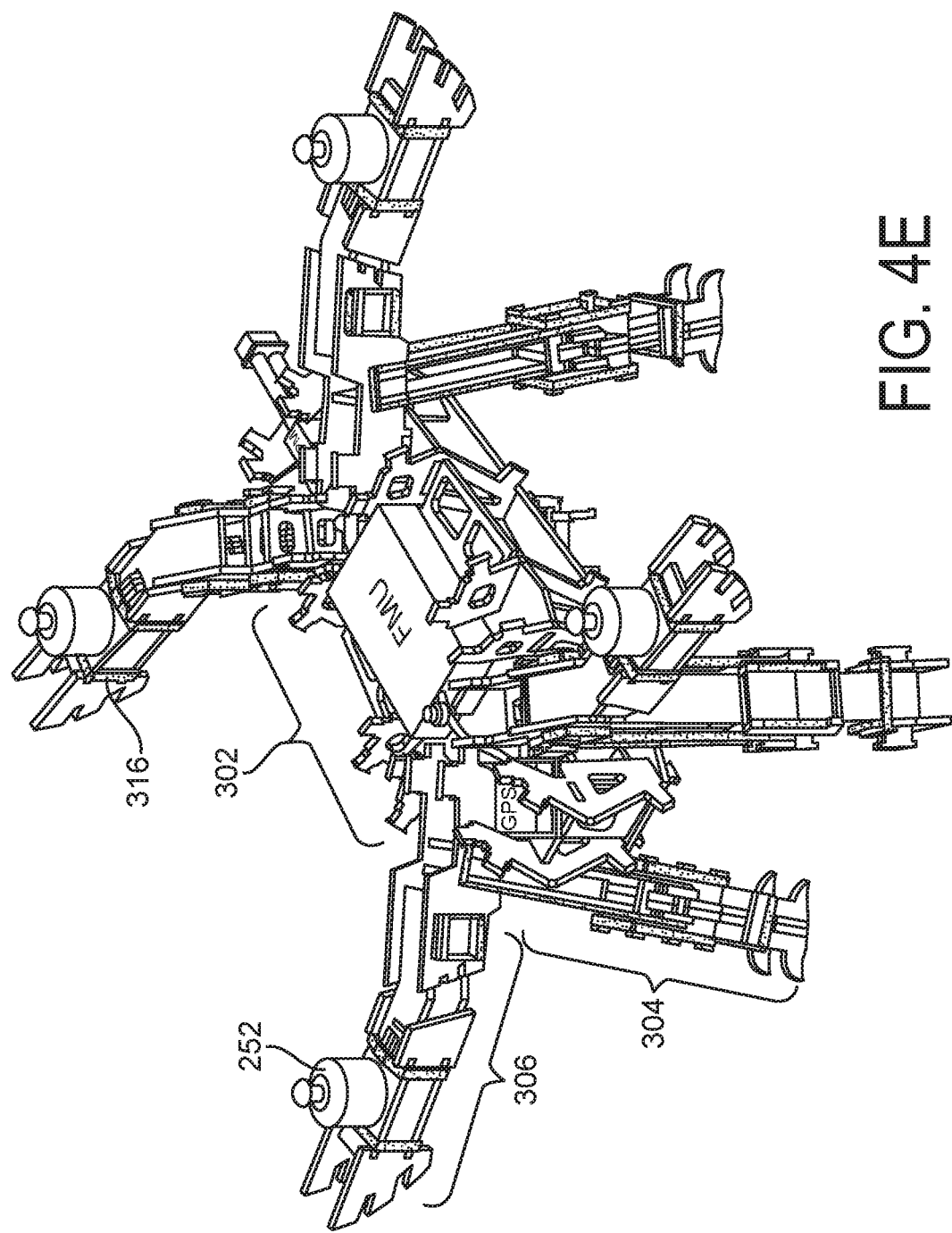
FIG. 4E illustrates a fifth subset of components of an example embodiment of a partially assembled drone.

FIG. 4E illustrates the partially assembled main body of FIG. 4C (including the center plate 402, connector plates 404, bottom plate 406, and electronics 260) coupled to a set of four air frame legs 304 and four air frame arms 306. Elastic bands 316 and motors 252 are also illustrated in FIG. 4E. Embodiments may furthermore include additional elastic bands 316 that are not illustrated in FIG. 4E.

Figure 4F:
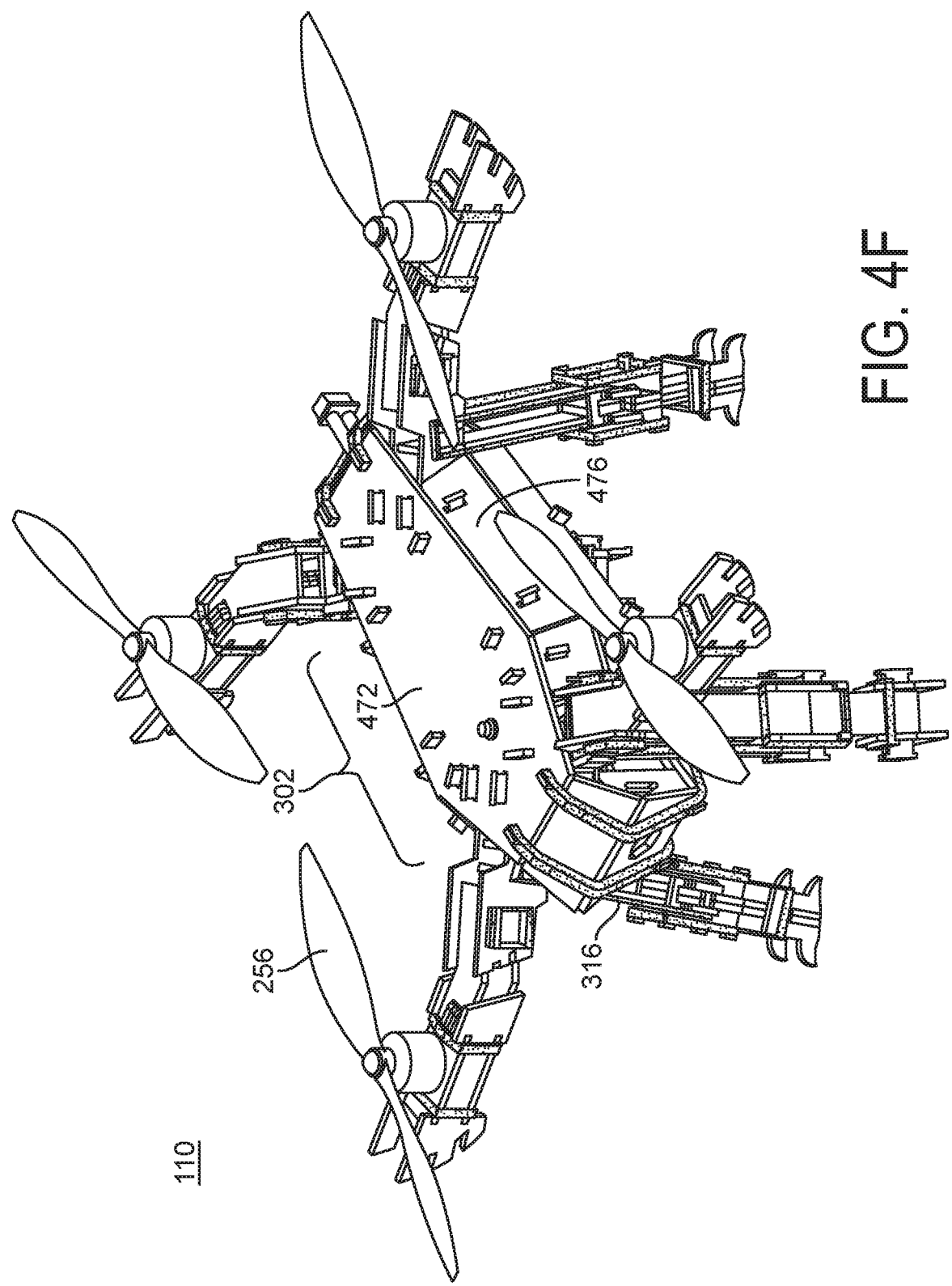
FIG. 4F illustrates an example embodiment of an assembled drone.

FIG. 4F illustrates a fully assembled drone 110. Relative to FIG. 4E, the drone 110 now includes a top plate 472, front and side plates 474, and propellers 256. Here, the top plate 472 and front and side plates 476 each include a plurality of mortises that mate with tenons of the vertical connector plates 404 to secure the structure together. Elastic bands 316 may be utilized around the front and rear of the drone 110, the sides, and other elements to further secure the plates of the main drone body 302. The front and side plates 476 have top edges aligned with edges of the top plate 472 and bottom edges aligned with edges of the bottom plate 406 to form an enclosed structure. In an embodiment, the front and side plates 476 include a plurality of upper plates having top edges that meet the edges of the top plate 472 at an obtuse angle and lower plates having bottom edges that meet edges of the bottom plate 406 at an obtuse angle. The upper and lower plates of the front and side plates 476 also meet at an obtuse angle such that the main air frame body 302 is bowed outward at the center plate 302.

The combination of the center plate 302, the bottom plate 406, the top plate 472, the connector plates 404, the upper and lower plates of the front and side plates 476 of the main airframe body 302, and the elastic bands provide a very strong, structurally rigid container, and provides a protective enclosure for the control electronics 260 to protect them from damage if the drone 110 crashes or is otherwise damaged.

Figure 4G:
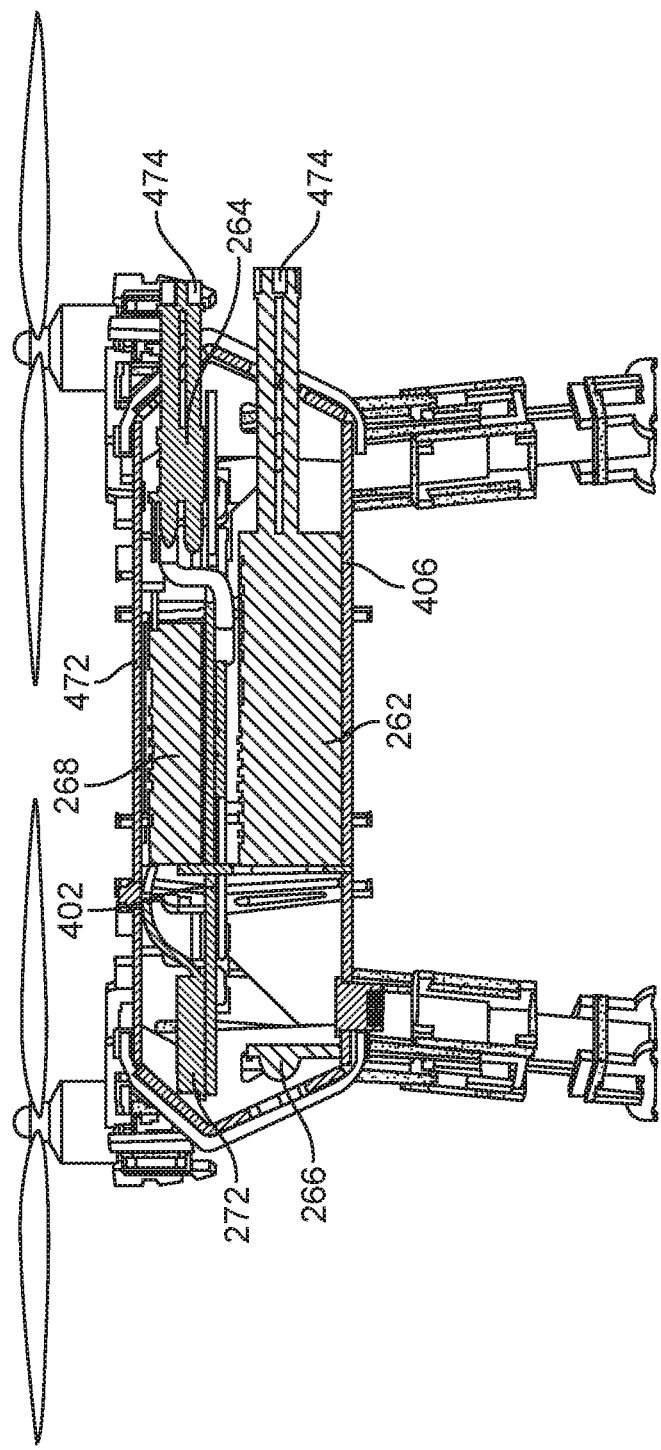
FIG. 4G illustrates a cross-sectional view of an example embodiment of a drone.

FIG. 4G is a cross-sectional view of a drone 110. The cross-sectional view illustrates the battery 262 and one of the sensors 266 (e.g., a camera) positioned between the lower plate 406 and the center plate 402, and a location sensing unit 272, a flight management unit 268, and a power management unit 264 positioned between the center plate 402 and the upper plate 472. FIG. 4G also illustrates a cable system 474 that includes a set of detachable cables for connecting between the power management unit 264 and the battery 262. In an embodiment, the connection may be made externally to the drone body 302 to enable the cables to be easily connected or disconnected (e.g., to enable connection of the battery 262 to a charger 150). Furthermore, this configuration enables the battery 262 to be easily removed from the main body 302 (e.g., for replacement with a fully charged battery) by removing one of the lower rear plates of the main body 302 without removing additional plates on the upper portion of the drone 110 that would expose additional control electronics 260.

Figure 5:
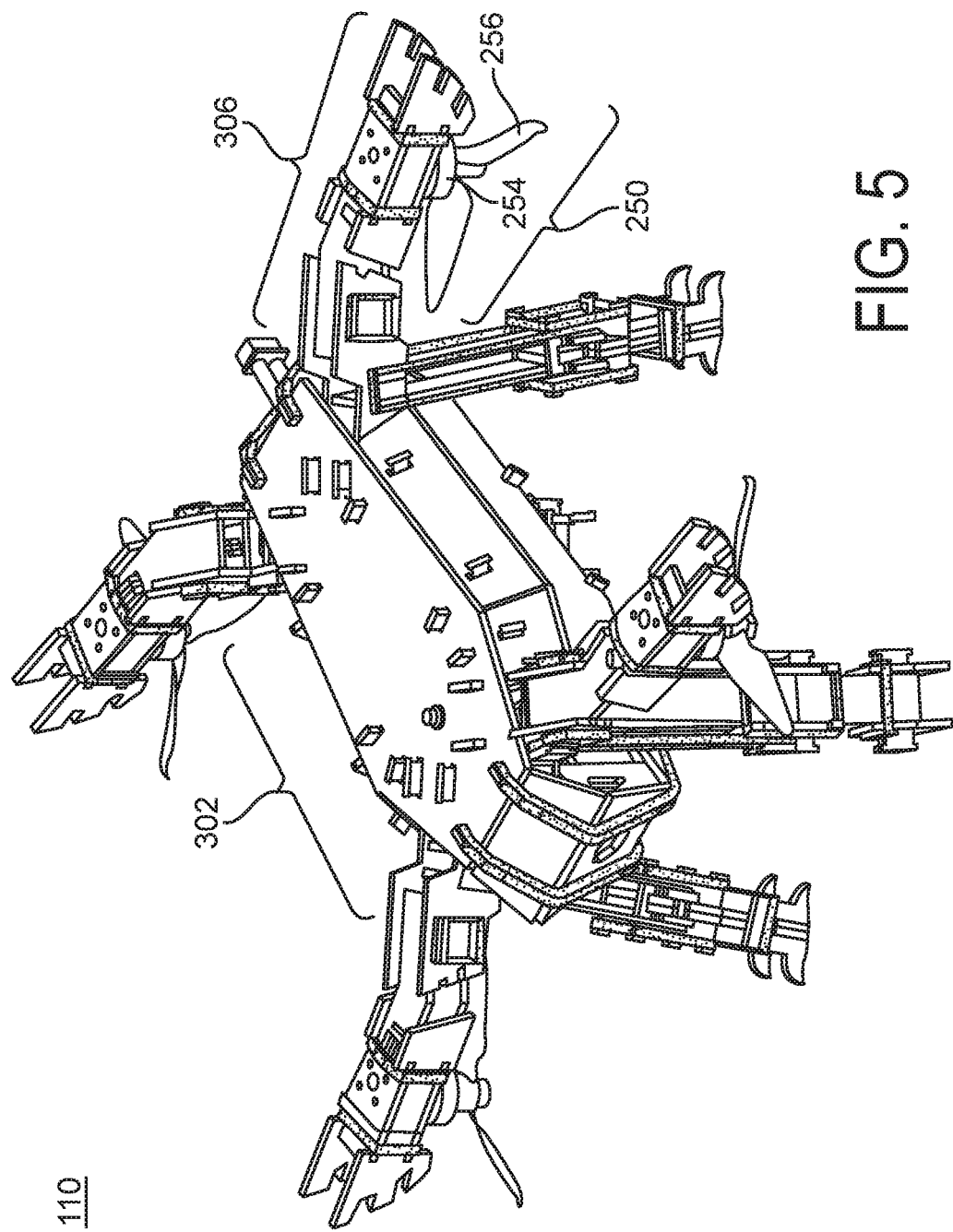
FIG. 5 illustrates an example embodiment of an assembled drone with motor assemblies configured in a downward configuration.

FIG. 5 illustrates an alternative configuration of the drone 110 in which the motor assemblies 250 are attached facing down below the air frame arms 306 with the propellers 256 below the motors 254. In an embodiment, the drone 110 may be configurable between the upward and downward positions of the motor assemblies 250 by simply removing and re-attaching the motor assemblies 250 depending on the desired configuration. Alternatively, different motor assemblies 250 may be utilized in the downward position than the upward position. The various motor assemblies may be attached using a similar attachment mechanism to enable them to be easily swapped in or out. For example, in an embodiment, different sized motors 254 and propellers 256 may be attached to achieve different power levels, maneuverability, and speed.

FIGS. 6A-E illustrates an example embodiment of a drone system that includes a set of drones 610 (e.g., a first drone 610-1, a second drone 610-2, a third drone 610-3, and a fourth drone 610-4) that can operate independently in a standalone configuration 675 or can be combined into one or more group configurations 680, 690, 695. The drones 610 each include a flight management unit 668 that is configurable between operating in at least a standalone controller mode and a group configuration controller mode. In the standalone controller mode, the flight management unit 668 controls flight of an individual drone 610 as described above. For example, in a quadcopter configuration, the flight management unit 668 may control speed of each of the four motor assemblies.

In the group configuration controller mode, a flight management unit 668 may be configured as a master flight management unit 668-M to control flight of the group configuration 680, 690, 695. For example, when the group configuration is an octocopter, the master flight management unit 668-M may control speed of each of the eight motor assemblies 650 on the different drones 610 combined into the group configuration 680, 690. In other configurations that are not necessarily octocopters (e.g., configuration 695), the master flight management unit 668-M may control any arbitrary number of motor assemblies 650 in various layouts. In an embodiment, one or more of the flight management units 668 may furthermore be configured in an auxiliary controller mode as an auxiliary flight management unit 668-A to control one or more auxiliary functions of the group configuration. When configured in an auxiliary controller mode, the flight management unit 668-A may provide a supplemental function selected from a set of possible configurable options. For example, the flight management unit 668-A of one drone 610 may be configured in a camera mode to control and process images from a camera. The flight management unit 668-A of another drone 610 may be configured in an arm control mode to provide control of a grabber arm. In other examples, the flight management unit 668-A may be configured to control a projectile device, a lighting system, an aerosol or liquid spray system, a speaker or microphone system, or a radio relay system. The flight management unit 668-A of another drone 610 may be configured as an auxiliary sensor processor to process sensor data from one or more sensors or as an auxiliary image processor that may be utilized by the master flight management unit 668-M.

In an embodiment, one or more of the drones 610 may include features described above. For example, one or more of the drones 610 may be assembled from a flat-packable drone kit and have the structure of drone 110 described above. In other embodiments, one or more of the drones 610 may comprise a unibody drone that is not necessarily assembled from a flat-packable drone kit and does not necessarily have all of the features of the drone 110 described above.

Figure 6A:
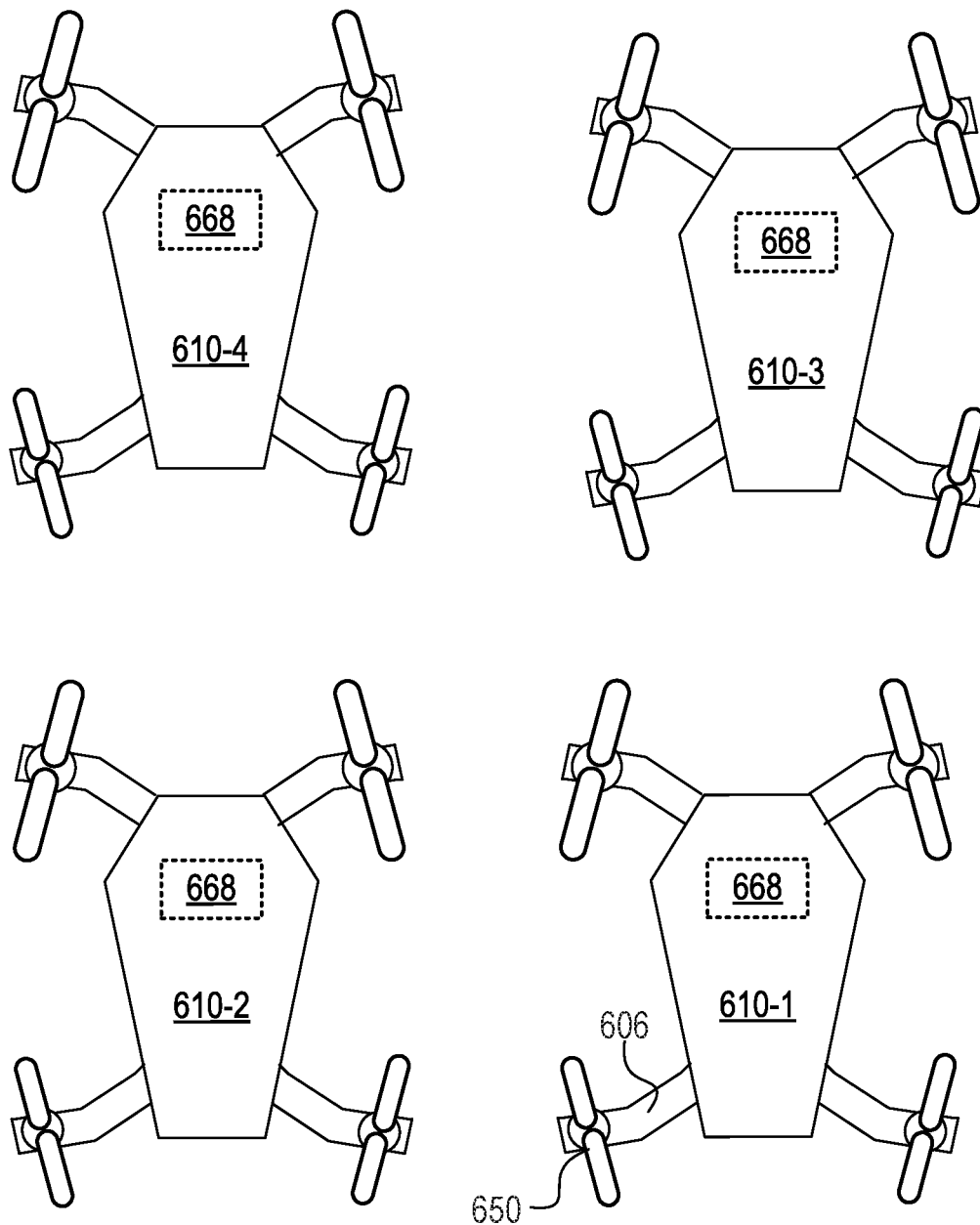
FIG. 6A illustrates an example embodiment of a drone system with a set of drones in a standalone configuration.

In FIG. 6A, the drones 610 are configured in a standalone configuration 675 for standalone operation. In the illustrated embodiment, each drone 610 comprises a quadcopter that is controlled by a respective flight management unit 668. Each drone 610 furthermore has a set of motor assemblies 650 (e.g., four motor assemblies per drone 610) coupled to respective air frame arms 606 (e.g., four air frame arms 606 per drone 610). The flight management units 668 may each be configured in the standalone mode in which they operate to control flight of the corresponding drone 610. For example, in an embodiment, each drone 610 operates in the standalone configuration as a quadcopter and the flight management units 668 operate in a standalone mode to provide flight control for a quadcopter.

Figure 6B:
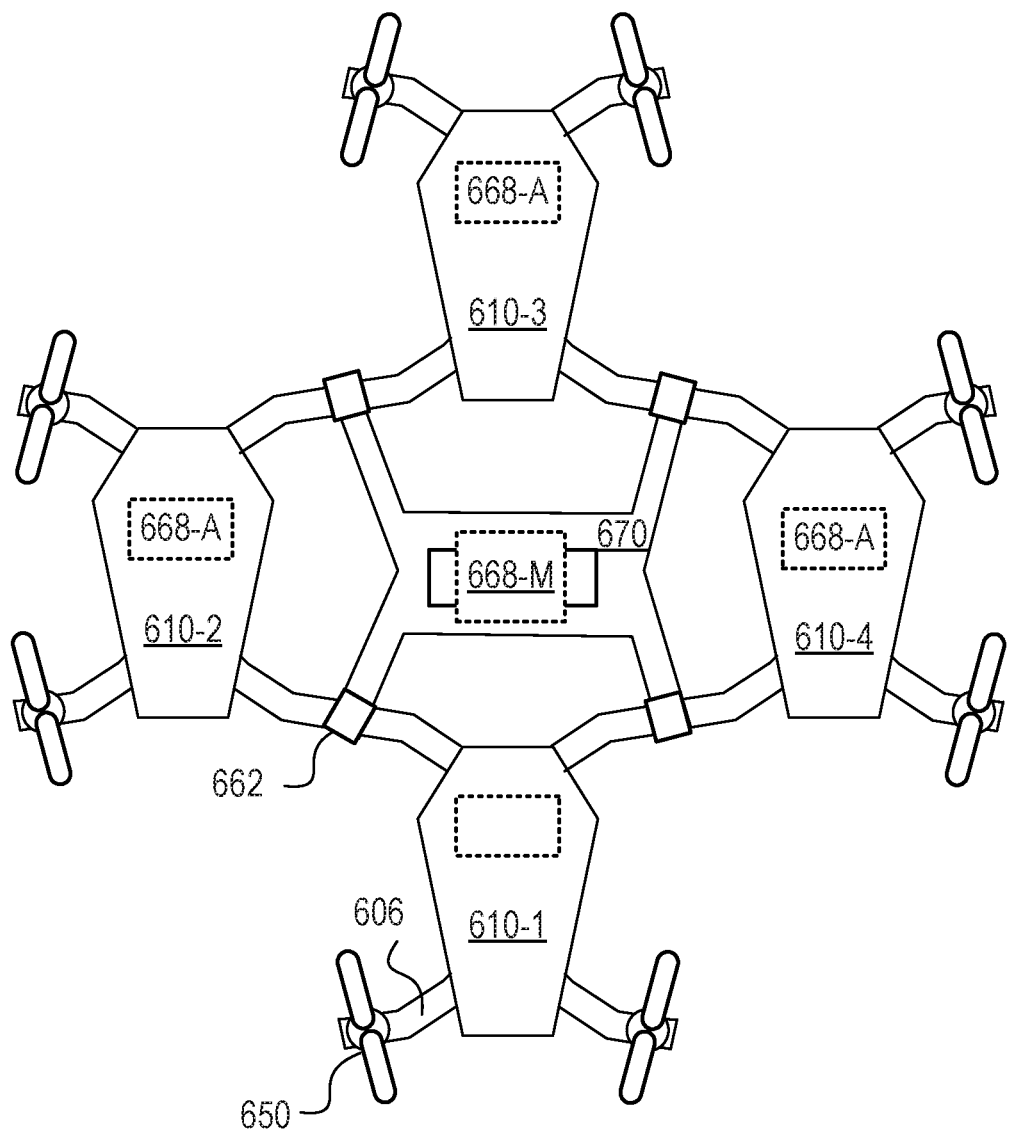
FIG. 6B illustrates a top view of an example embodiment of a drone system with a set of drones in a first group configuration.
Figure 6C:
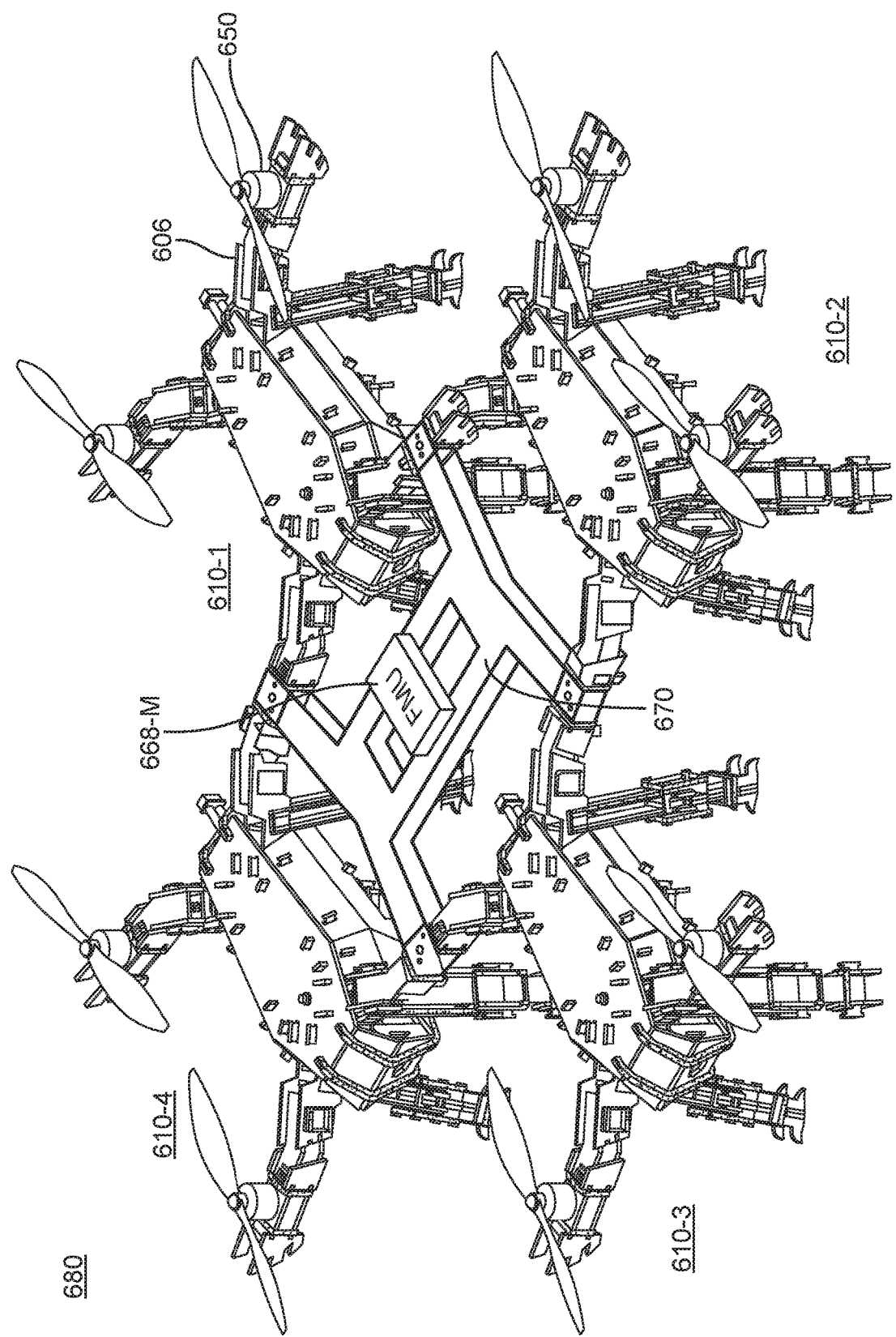
FIG. 6C illustrates a perspective view of an embodiment of a drone system with a set of drones in a first group configuration.
Figure 6D:
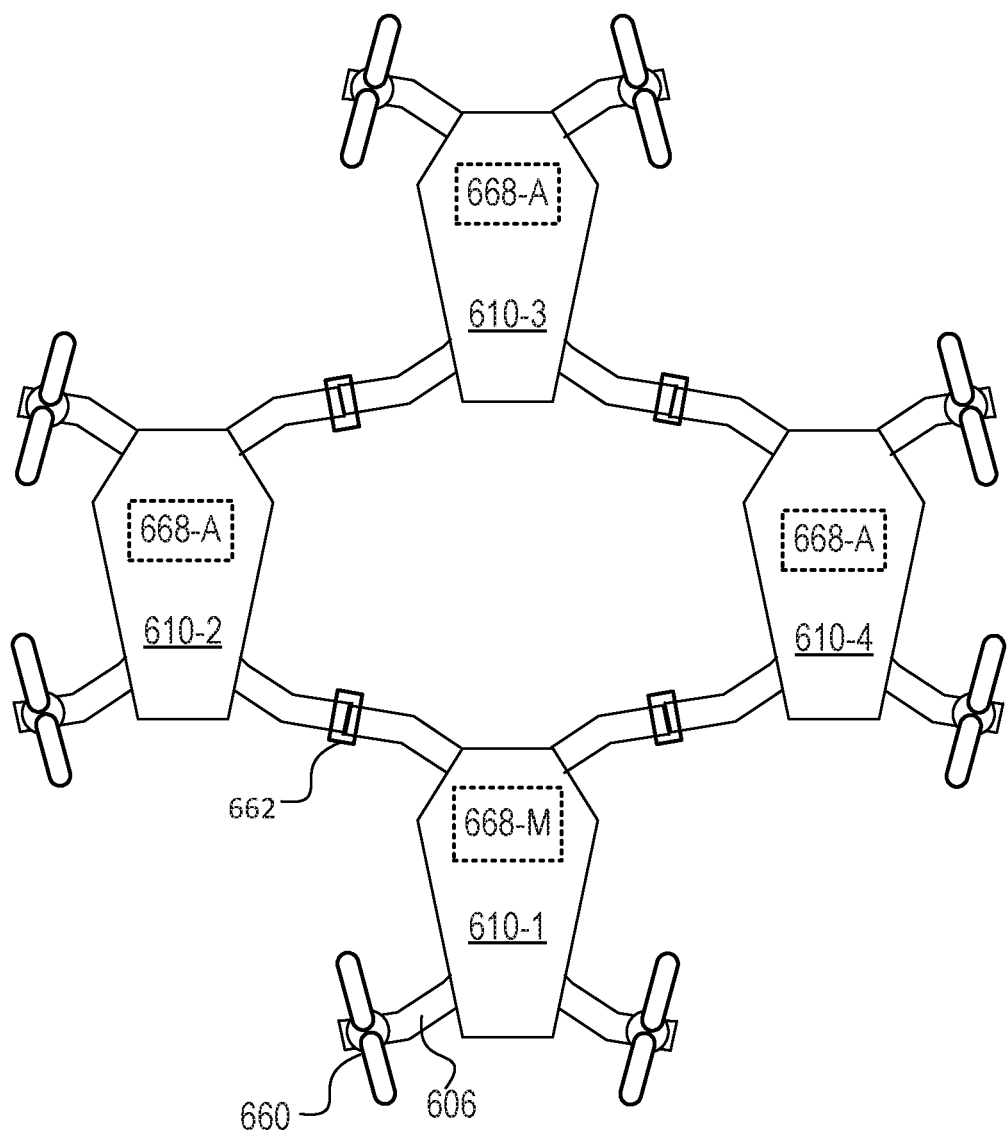
FIG. 6D illustrates an example embodiment of a drone system with a set of drones in a second group configuration.

In FIGS. 6B-D, the drones 610 are coupled together into different group configurations 680, 690 that each operate as an octocopter. Here, each drone 610 is modified to remove motor assemblies 650 from two of the air frame arms 606. The air frame arms 606 with the removed motor assemblies 650 are then each coupled to each other in the structure shown using a connector system including a set of arm connectors 662 and optionally a center hub 670 (e.g., in the group configuration 680). For example, in an embodiment, the front-left and front-right motor assemblies 650 are removed from a first drone 610-1, the rear-right and front-right motor assemblies 650 are removed from a second drone 610-2, the rear-left and rear-right motor assemblies 650 are removed from a third drone 610-3, and the rear-left and front-left motor assemblies 650 are removed from a fourth drone 610-4. The air frame arms 606 with the removed motor assemblies 650 are coupled together with each air frame arm 606 coupled to an air frame arm 606 of an adjacent drone 610. For example, in an embodiment, a first arm connector 662 connects a front-left air frame arm 606 of a first drone 610-1 with a rear-right air frame arm 606 of a second drone 610-2; a second arm connector 662 connects a front-right air frame arm 606 of the second drone 610-2 with a rear-left air frame arm 606 of the third drone 610-3; a third connector 662 connects a rear-right air frame arm 606 of the third drone 610-3 with a front-left air frame arm 606 of the fourth drone 610-4; and a fourth arm connector 662 connects a rear-left air frame arm 606 of the fourth drone 610-4 with a front-right air frame arm 606 of the first drone 610-1.

The resulting structure is an octocopter in which the interior set of air frame arms 606 are coupled together and have their motor assemblies 650 removed and an exterior set of air frame arms 606 include their respective motor assemblies 650.

In the group configuration 680 of FIGS. 6B-C, a center hub 670 furthermore connects to arm connectors 662 of the drones 610 to provide additional structural integrity. The center hub may optionally provide a centralized location for a master flight management unit 668-M. In the illustrated embodiment, the flight management unit 668-M has been moved from the main air frame body of one of the drones 610-1 to the location at the center hub 670. In an embodiment, the center hub 670 includes electrical connectors and wiring for connecting to wiring through the air frame arms 606 of the drones 610. For example, when in the standalone configuration, wiring may enable communication between the flight management unit 668 and the motor assemblies 650 in each drone 610, but in the group configuration 680, the same wiring may be utilized to connect the master flight management unit 668-M to the active motor assemblies 650 of the octocopter. In an alternative embodiment, the flight management unit 668 of one of the drones 610 may be reconfigured as a master flight management unit 668-M for the group configuration 680 without necessarily physically moving it to the center hub 670. Electrical connections to the other drones 610 may be made using existing wiring through the air frame arms 606 using direct connections through the connected air frame arms 606, or using wiring through the center hub 670.

The group configuration 690 of FIG. 6D does not utilize the center hub 670. In this embodiment, the drones 610 are connected directly together using a set of connectors 662. Here, one of the flight management units 668 of a drone 610 is configured as a master flight management unit 668-M, while one or more other flight management units 668 may be configured as auxiliary flight management units 668-A.

Figure 6E:
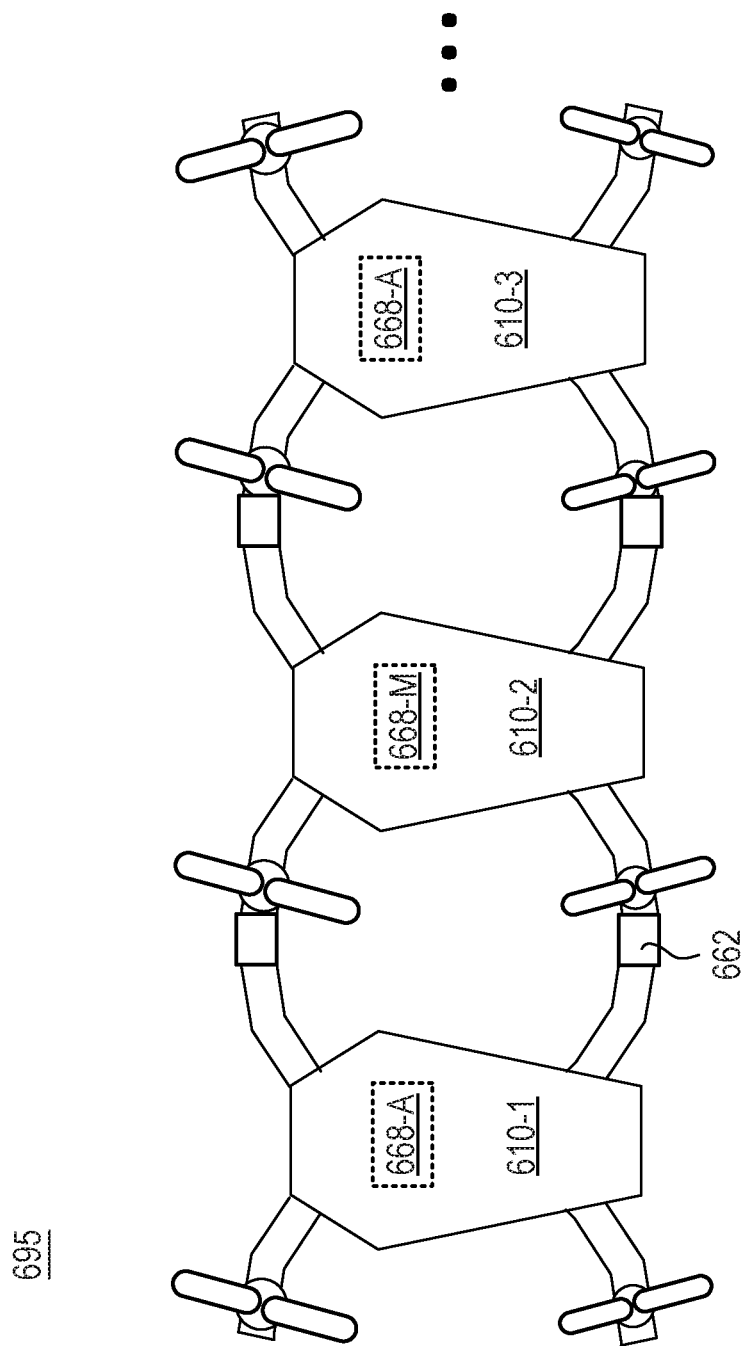
FIG. 6E illustrates an example embodiment of a drone system with a set of drones in a third group configuration.

FIG. 6E illustrates another embodiment of a group configuration 695 in which a group of drones 610 are coupled in a line to form a linear multicopter. Here, the drones 610 are arranged such that adjacent arms are coupled together by arm connectors 662. For example, the right-rear and right-front arms of a first drone 610-1 are coupled to the left-rear and left-front arms of a second drone 610-2, the right-rear and right-front arms of the second drone 610-2 are coupled to the left-rear and left-front arms of a third drone 610-3, and so on for any number of drones 610. Motor assemblies 650 may be removed from one of the drones 610 in each connected arm pair so that the respective assemblies 650 do not interfere with each other. As in the above-described configurations, one of the flight management units 668 may be configured to operate as a master flight management unit 668-M while other flight management units 668 may be configured to operate in auxiliary modes as auxiliary flight management units 668-A to perform various auxiliary functions. This configuration 695 may be useful for enabling the drones 610 to lift and carry an elongated object such as a log or pipe.

The group configurations 680, 690, 695 of FIGS. 6B-E illustrate each of the drones 610 oriented in the same direction. In alternative embodiments, the group configurations 680, 690, 695 can be constructed with drones 610 facing different directions. For example, in one configuration, the drones 610 may be arranged with each drone 610 facing outward so that a 360 degree view may be captured by cameras on the front faces of the drones 610. In other alternative embodiments, a different number of drones 610 may be coupled in a group configuration. For example, a group configuration may be constructed from two, three, four, six, eight, twelve or sixteen drones. In further embodiments, group configurations can be constructed from other arrangements of two or more individual drones 610. Generally, such configurations are made by coupling the arms 606 together into various ways. For example, in one embodiment a group configuration may comprise a square octocopter in which a set of drones 610 are coupled in a square shape or a different polygon.

Figure 7:
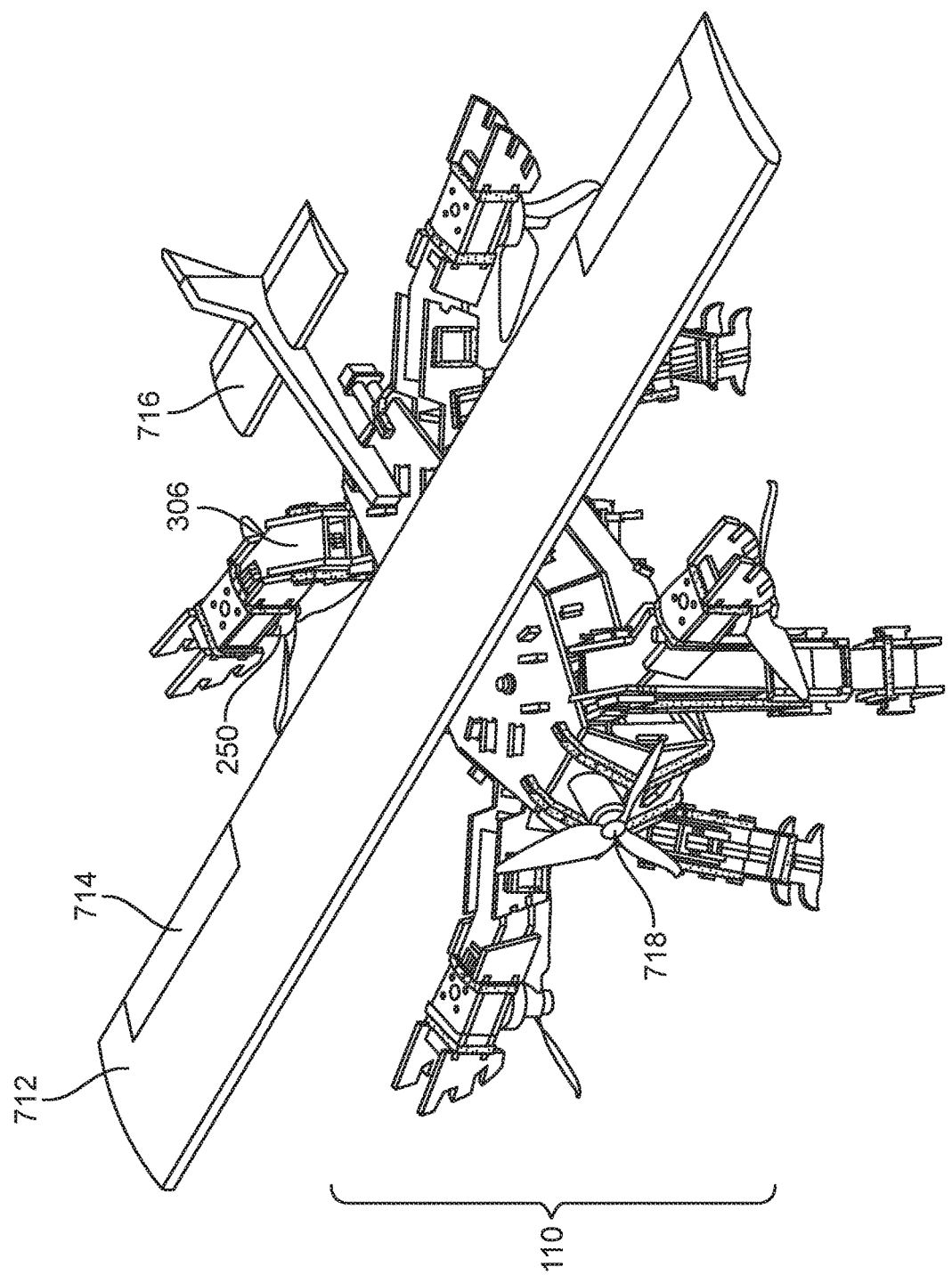
FIG. 7 illustrates an example embodiment of a drone in a forward flight configuration with a wing attachment.

FIG. 7 illustrates an example embodiment of a drone 110 with a wing attachment 712 attached across a top plate of the drone 110. The drone 110 may furthermore include a front motor assembly 718 (including a motor, a propeller, and a motor controller) attached to a front of the drone 110 and a tail attachment 716 extending from a rear of the drone 110. In this embodiment, the motor assemblies 250 of the drone 110 are furthermore configured in a downward configuration in which they are attached below the airframe arms 306. This configuration enables the drone 110 to perform forward flight and gliding maneuvers consistent with a propeller plane or glider. In one embodiment, the flight management unit 268 may operate in a multicopter mode to control the motor assemblies 250 on the arms 306 during takeoff and landing in a manner that achieves vertical takeoff and landing. Once airborne, the flight management unit 268 may transition to a forward flight mode in which the front motor assembler 718 is activated (and the vertical motor assemblies 250 on the arms 306 may be deactivated) to control flight. The wing attachment 712 may optionally include flaps 714 that may be controllable by the flight management unit 268 to control steering during the forward flight mode. Alternatively, the flight management unit 268 may activate the motor assemblies 250 on the arms 306 to achieve steering during the forward flight mode. Beneficially, the forward flight mode may enable the drone 110 to cover significantly more distance on the same battery capacity relative to a traditional quadcopter. The wing attachment 712, tail attachment 716, and front motor assembly 718 may be easily added to enable quick transition of the drone 110 from a multicopter-only configuration to the forward flight configuration. Furthermore, the flight management unit 268 may be reconfigured via the drone control application 125 to enable operation consistent with the forward flight configuration, or may be reconfigured automatically upon detecting attachment of the wing attachment 712.

In another embodiment, a wing attachment 712 may be attached across multiple drones 610 configured in a group configuration such as the group configurations 680, 690, 695 described above. In this embodiment, the master flight management unit 668-M may include a forward flight control mode specific to the group configuration 680, 690, 695 to control flight consistent with the forward flight.

Upon reading this disclosure, those of skill in the art will appreciate still additional alternative structural and functional designs for the disclosed embodiments from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the disclosed embodiments herein without departing from the scope.

The invention claimed is:

1. A drone system comprising:
a set of drones modifiable between respective standalone configurations and a group configuration, wherein the set of drones are detached from each other and execute independent flights when assembled in the standalone configuration and wherein the set of drones are coupled together and modified relative to the standalone configuration to execute a group flight when assembled in the group configuration;
wherein the set of drones each include a main body, a set of airframe arms that extend outwardly from the main body, and respective detachable motor assemblies attachable to respective attachment points at respective distal ends of the set of airframe arms opposite the main body, wherein the detachable motor assemblies are attached to each of the set of airframe arms in the standalone configuration, and wherein a subset of the detachable motor assemblies are detached from a respective subset of airframe arms in the group configuration;
a connector system to connect the set of drones together when assembled in the group configuration via respective connectors that couple between respective distal ends of pairs of the airframe arms, each of the pairs including at least one of the subset of airframe arms with the detached motor assemblies; and
a set of flight management units each operable in at least a standalone mode and a group mode, wherein a first flight management unit of the set of flight management units controls a standalone flight of a first drone of the set of drones when operating in the standalone mode and controls a group flight of the group configuration when operating in the group mode.

2. The drone system of claim 1, wherein the set of flight management units are further operable in an auxiliary controller mode, wherein at least a second flight management unit of the set of flight management units is operable to control an auxiliary function of the group configuration when the second flight management unit operates in the auxiliary controller mode.

3. The drone system of claim 2, wherein the auxiliary function comprises at least one of:
controlling a camera;
performing image processing of data from the camera;
processing auxiliary sensor data;
controlling a projectile device;
controlling a lighting system;
controlling an aerosol or liquid spray system;
performing a radio relay service; and
controlling a mechanical grabber arm.

4. The drone system of claim 1, wherein the connector system comprises:
center hub to connect to each of the set of drones when assembled in the group configuration.

5. The drone system of claim 4, wherein the center hub is structured to house a flight management unit operating to control the group flight when the set of drones is assembled in the group configuration.

6. The drone system of claim 1, wherein when assembled in the group configuration, the set of drones comprises an interior set of air frame arms connectable to the connector system and without the detachable motor assemblies, and the set of drones comprises an exterior set of air frame arms with attached motor assemblies.

7. The drone system of claim 1, wherein each of the detachable motor assemblies includes a motor and a propeller, wherein at least a second subset of the detachable motor assemblies are attached when the set of drones is assembled in the group configuration.

8. The drone system of claim 7, wherein the set of drones includes a set of four drones each including four air frame arms and four motor assemblies when assembled in the standalone configuration, wherein when assembled in the group configuration, the set of drones comprises:
a first drone with first motor assemblies on its rear-left and rear-right air frame arms;
a second drone with second motor assemblies on its rear-left and front-left air frame arms;
a third drone with third motor assemblies on its front-left and front-right air frame arms; and
a fourth drone with fourth motor assemblies on its right-rear and right-front air frame arms.

9. The drone system of claim 1, wherein the connector system comprises:

a first connector to connect a first air frame arm of a first drone and a first air frame arm of a second drone;

a second connector to connect a second air frame arm of the second drone and a first air frame arm of a third drone;

a third connector to connect a second air frame arm of the third drone with a first air frame arm of a fourth drone; and a fourth connector to connect a second air frame arm of the fourth drone with a second air frame arm of the first drone.

10. The drone system of claim 1, wherein the set of drones comprises a set of four drones each including a front-right air frame arm, a front-left air frame arm, a rear-right air frame arm, and a rear-left air frame arm, wherein the connector system comprises:

a first connector to connect a front-left air frame arm of a first drone and a rear-right air frame arm of a second drone;

a second connector to connect a front-right air frame arm of the second drone and a rear-left air frame arm of a third drone;

a third connector to connect a rear-right air frame arm of the third drone with a front-left air frame arm of a fourth drone; and a fourth connector to connect a rear-left air frame arm of the fourth drone with a front-right air frame arm of the first drone.

11. The drone system of claim 1, wherein the set of drones each operate as quadcopters in the standalone configuration and wherein the set of drones operate as an octocopter on the group configuration.

12. The drone system of claim 1, wherein the set of drones comprises a set of drones connected in a line.

13. A drone system comprising:

a set of main air frame bodies;

a set of connecting air frames arms extending laterally from the set of main air frame bodies and having respective attachment points at respective distal ends opposite the main air frame bodies, each pair of connecting air frame arms connecting to each other at the respective distal ends to couple between adjacent ones of the main air frame bodies;

a set of propelling air frame arms extending laterally from the set of main air frame bodies, each of the set of propelling air frame arms equipped with respective motor assemblies having respective motors and propellers; and a center hub to connect the set of connecting air frame arms at the respective attachment points and to house a flight management unit for controlling flight of the drone system by driving the respective motors to cause rotation of the respective propellers.

14. The drone system of claim 13, wherein the set of main air frame bodies comprises four main air frame bodies each with a set of two propelling air frame arms and a set of two connecting air frame arms.

15. The drone system of claim 13, further comprising one or more auxiliary controllers for controlling an auxiliary function of the drone system.

16. A drone comprising:

a main air frame body;

a plurality of air frame arms coupled to the main air frame body and extending radially from the main air frame body, the plurality of air frame arms having respective attachment points at respective distal ends opposite of the main air frame body;

a plurality of motor assemblies including a subset of the plurality of motor assemblies that are structured to couple to a subset of the plurality of air frame arms at the respective attachment points when the drone is assembled in a standalone configuration and to be removed from the subset of the plurality of air frame arms when the drone is assembled for a group configuration;

a set of connectors structured to attach between respective distal ends of the subset of the plurality of air frame arms and respective distal ends of air frame arms of one or more additional drones when the drone is assembled for the group configuration, and the set of connectors structured to be removed from the subset of the plurality of air frame arms when the drone is assembled in the standalone configuration; and a flight management unit to control flight of the drone when operating in a standalone mode operational when the drone is assembled in the standalone configuration and to control flight of the group configuration when operating in a group mode operational when the drone is assembled for the group configuration.

17. The drone of claim 16, further comprising:

a plurality of air frame legs coupled to the main air frame body and extending at a downward angle from the main air frame body.

18. The drone of claim 16, wherein the flight management unit is operational to control an auxiliary function of the drone in an auxiliary mode.

* * * * *